US009922111B1

(12) United States Patent
Emigh et al.

(10) Patent No.: US 9,922,111 B1
(45) Date of Patent: *Mar. 20, 2018

(54) DATA RESTORATION UTILIZING REDUNDANCY DATA

(71) Applicant: SPECTRUM PATENTS, INC., Longview, TX (US)

(72) Inventors: Aaron Emigh, Incline Village, NV (US); James Roskind, Redwood City, CA (US)

(73) Assignee: SPECTRUM PATENTS, INC., Longview, TX (US)

( * ) Notice: Subject to any disclaimer, the term of this patent is extended or adjusted under 35 U.S.C. 154(b) by 178 days.

This patent is subject to a terminal disclaimer.

(21) Appl. No.: 14/953,379

(22) Filed: Nov. 29, 2015

Related U.S. Application Data

(63) Continuation of application No. 12/488,605, filed on Jun. 22, 2009, now Pat. No. 9,201,941, which is a
(Continued)

(51) Int. Cl.
*G06F 17/30* (2006.01)
*G06F 21/62* (2013.01)
(Continued)

(52) U.S. Cl.
CPC .... *G06F 17/30595* (2013.01); *G06F 11/1453* (2013.01); *G06F 11/1458* (2013.01);
(Continued)

(58) Field of Classification Search
CPC .......... G06F 17/30595; G06F 11/1453; G06F 11/1458; G06F 21/6218; G06F 11/1446;
(Continued)

(56) References Cited

U.S. PATENT DOCUMENTS

| 5,931,947 | A  | * | 8/1999 | Burns ................. G06F 21/6209 726/4 |
| 7,412,462 | B2 | * | 8/2008 | Margolus .......... G06F 17/30097 |

(Continued)

OTHER PUBLICATIONS

Gray et al. The Recovery Manager of the System R Database Manager; 1981; 20 pages.*

*Primary Examiner* — Noosha Arjomandi
(74) *Attorney, Agent, or Firm* — Cotman IP Law Group, PLC

(57) ABSTRACT

In some embodiments, techniques for data backup and restoration comprise creating a redundancy data element by computing an erasure correcting code on elements of data from a first set of computers that includes a first computer and a second computer, wherein the elements of data includes a first data element from the first computer and a second data element from the second computer; transmitting the redundancy data element to a third computer for storage thereon; receiving a request for data restoration relating to the first data element; creating a restoration data, wherein the restoration data is a reconstruction of the first data element, wherein creating the restoration data includes computing an erasure correcting code on elements of data that include the second data element and the redundancy data element; and providing the restoration data responsive to the request for data restoration.

20 Claims, 38 Drawing Sheets

Related U.S. Application Data continuation of application No. 10/982,714, filed on Nov. 4, 2004, now Pat. No. 7,596,570.

(60) Provisional application No. 60/517,625, filed on Nov. 4, 2003.

(51) Int. Cl.
*G06F 11/14* (2006.01)
*G06F 11/20* (2006.01)

(52) U.S. Cl.
CPC ...... *G06F 21/6218* (2013.01); *G06F 11/1464* (2013.01); *G06F 11/1469* (2013.01); *G06F 11/2094* (2013.01); *G06F 2201/84* (2013.01); *G06F 2221/2103* (2013.01); *Y10S 707/99943* (2013.01)

(58) Field of Classification Search
CPC ............. G06F 11/1448; G06F 11/1469; G06F 17/3015
See application file for complete search history.

(56) References Cited

U.S. PATENT DOCUMENTS

| | | | | |
|---|---|---|---|---|
| 7,424,498 | B1* | 9/2008 | Patterson | G06F 12/0253 |
| 7,451,168 | B1* | 11/2008 | Patterson | G06F 12/0269 |
| 7,783,600 | B1* | 8/2010 | Spertus | G06F 11/10 |
| | | | | 707/610 |
| 8,935,366 | B2* | 1/2015 | Mehr | G06F 11/1458 |
| | | | | 709/220 |
| 2001/0056425 | A1* | 12/2001 | Richard | G06F 11/1461 |
| 2002/0038296 | A1* | 3/2002 | Margolus | G06F 17/30097 |
| 2003/0018878 | A1* | 1/2003 | Dorward | G06F 17/30188 |
| | | | | 711/216 |
| 2003/0046260 | A1* | 3/2003 | Satyanarayanan | G06F 17/30106 |
| 2003/0074406 | A1* | 4/2003 | Noble | G06F 21/6218 |
| | | | | 709/205 |
| 2004/0030852 | A1* | 2/2004 | Coombs | G06F 11/1448 |
| | | | | 711/162 |
| 2004/0167898 | A1* | 8/2004 | Margolus | G06F 17/30368 |
| 2010/0274762 | A1* | 10/2010 | Murphy | G06F 11/1446 |
| | | | | 707/636 |
| 2010/0274983 | A1* | 10/2010 | Murphy | G06F 11/1456 |
| | | | | 711/162 |

\* cited by examiner

DATA RESTORATION UTILIZING REDUNDANCY DATA

CROSS REFERENCE TO OTHER APPLICATIONS

This application is a continuation of co-pending U.S. patent application Ser. No. 12/488,605, entitled EFFICIENT DATA SHARING, filed Jun. 22, 2009, which is incorporated herein by reference for all purposes, which is a continuation of U.S. patent application Ser. No. 10/928,714, now U.S. Pat. No. 7,596,570, entitled DATA SHARING, filed Nov. 4, 2004, which is incorporated herein by reference for all purposes, which claims priority to U.S. Provisional Patent Application No. 60/517,625, entitled SYSTEM AND METHOD FOR BACKUPS, filed Nov. 4, 2003, which is incorporated herein by reference for all purposes.

FIELD OF THE INVENTION

The present invention relates generally to the area of computer software, more specifically to the area of backups.

BACKGROUND OF THE INVENTION

A increasing amount of a variety of valuable information is stored as electronic data. Backing up data can help prevent unwanted data loss.

It would be useful to have improved techniques for backing up electronic data.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
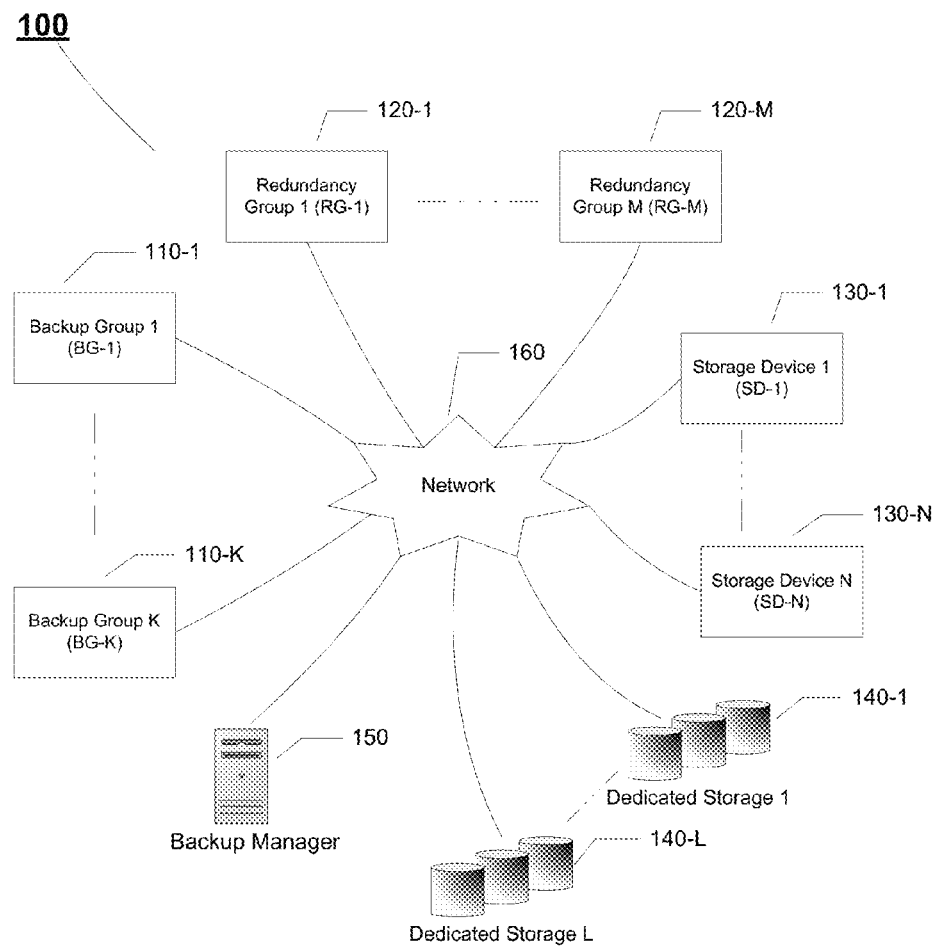
FIG. 1 depicts a construct for backing up data, according to some embodiments.

FIG. 1 depicts a construct 100 for backing up data, according to some embodiments. In this example, the construct 100 comprises a plurality of storage devices, SD-1 130-1, . . . , SD-N 130-N, that are connected via a network 160. The network 160 refers to a generic network, which may include the Internet, an intranet, a telephony network, a digital network, an analog network, a virtual network, a proprietary network, a wireless network, an optical network, a local area network (LAN), and/or a wide area network (WAN).

In this example, a storage device, as referred to herein, may correspond to a computer, a personal digital assistant (PDA), a server, a personal video recorder, a personal audio device, or any other type of device that stores data. A storage device may have data reside thereon and some or all of such data may be designated to be backed up on other storage device(s) via the network 160. In addition, a storage device may also designate a portion of its storage space for storing data from other storage device(s). In some embodiments, contribution of storage space may be designated with specification of corresponding operational parameters, such as a degree of availability or access speed. In some embodiments, one or more storage devices may be grouped together to form a backup group (BG). In some embodiments, a backup group refers herein to any such association of storage devices whose data may be backed up together. In some embodiments, a backup group refers herein to any such association of storage devices which may store data associated with each other. In some embodiments, within a backup group, data of a storage device may be backed up on one or more storage devices from the same backup group. Data of other storage devices from the same backup group may be backed up on a storage device that designates a portion of its storage space as backup storage. In some embodiments, data associated with a backup group, such as a copy of data, or redundancy data generated from the data, may be stored on one or more storage devices that are not members of the same backup group.

A backup group may be formed via different means. For example, a backup group may be formed by an IT manager from workstations on a corporate workgroup. A backup group may also be formed via peer-to-peer connection among a group of friends. A backup group may be formed over the Internet by individual users looking for backup partners through, for example, email lists or Usenet newsgroups. A backup group may be formed by a subscription-based service that assigns subscribers to backup groups automatically. For example, a computer or an Internet access subscription may be bundled with a trial subscription to a backup service, which can be enabled by means of a web site address and/or a key. In this case, when a customer goes to the specified web site address and the key is transmitted, for example automatically or by manual entry, the key's validity may be verified before permitting service. A backup group may then be formed from among customers who have applied for the service. Determination as to which parties to form into a backup group may be made based on different criteria, such as the amount of backup storage required, redundancy or data availability requirements, geography, network connectivity, peer-to-peer network topology, customer type, employer, and estimated availability of the customers' storage device(s).

In some embodiments, in backup operation, individual storage devices in a backup group may interact with each other for data backup in a peer-to-peer operational mode. In some embodiments, a backup group may operate in a centralized operational mode. For example, the construct 100 may optionally include a backup manager 150, which is connected to storage devices 130-1, . . . , 130-N, via the network 160 and may serve as a server that manages data backup operations among connected storage devices. In some embodiments, the backup manager 150 may be deployed by a service provider to support backup services to its customers. In some embodiments, the backup manager 150 may correspond to a device that is designated across the network 160 to perform functionalities that facilitate data backup for storage devices. In some embodiments, the backup manager 150 may be a storage device within a backup group that is designated to manage backup operations within the backup group.

In some embodiments, data of a storage device in a backup group may be backed up on a storage device outside of the backup group. The construct 100 may optionally comprise one or more dedicated storage devices, 140-1, . . . , 140-L, that may be used to store and/or backup data. A dedicated storage device may provide storage with some specified features such as a level of availability, a level of reliability, or a maximum latency time. Data in the construct 100 may be backed up on a dedicated storage device that satisfies, for example, certain requirements, which may be specified by the storage device. For instance, a storage device may indicate that its data is to be backed up so that the data can be accessed with specified availability. Backing up data on one or more storage devices that satisfy certain requirements may be achieved by matching the requirements as to the backup with features of available backup storage devices. Such matching may be carried out by different parties. For instance, the backup manager 150 may facilitate such operation. In other instances, a storage device that has data to be backed up may identify backup storage space when information about the backup storage is available to the storage device.

In some embodiments, a backup group may interface with other storage devices as an operable storage unit. The construct 100 may, for example, include one or more such backup groups, 110-1, . . . , 110-K, that may function as a storage device with its own internal backup operations. Such a backup group may have data to be backed up and/or may contribute a portion of its storage space for backing up data of other storage devices. In some embodiments, different computers in a household may form a backup group, optionally with a designated computer acting as a backup manager. Such a backup group may perform backup operations internally and in some embodiments, it may also present itself to the outside world as a single storage device, designating data to be backed up elsewhere and/or having contributed part of its storage space for backing up purposes. Data designated to be backed up for such a backup group may belong to individual storage devices or be shared by more than one storage device of the group. In some embodiments, such a backup group may be a member of second backup group so that its data designated to be backed up may be stored in other storage devices of the second backup group. For example, the backup group 1 110-1 may form another backup group with other storage devices such as storage device 1 130-1 and storage device N 130-N.

Backup may be carried out with respect to different types of data. In some embodiments, data itself is backed up. In some embodiments, redundancy data of the data may be backed up. Redundancy data refers herein to data used to back up other data. One example of redundancy data is a copy of data to be backed up. In some embodiments, redundancy data may be compressed and/or encrypted, for example compressed, then encrypted. Another example of redundancy data is data generated from data to be backed up, which may be subsequently used to restore data. An example of generated redundancy data is an error correcting code, such as parity data or Reed-Solomon data. Another example of redundancy data is a combination of replicated and generated redundancy data. In some embodiments, both data and associated redundancy data may be backed up. In some embodiments, data and/or redundancy data may be backed up on storage devices of other backup groups. In some embodiments, data of an individual storage device within a backup group may be backed up on one or more other storage devices within the same backup group. Redundancy data of a backup group may be backed up on, for example, one or more storage devices outside of the underlying backup group. In some embodiments, storage devices may be grouped together to form redundancy groups to provide backup space for redundancy data. For example, the construct 100 may comprise one or more redundancy groups, 120-1, . . . , 120-M, wherein each redundancy group may include one or more storage devices, each of which may contribute a portion of its storage space as backup space and such space may be allocated for storing redundancy data.

Figure 2:
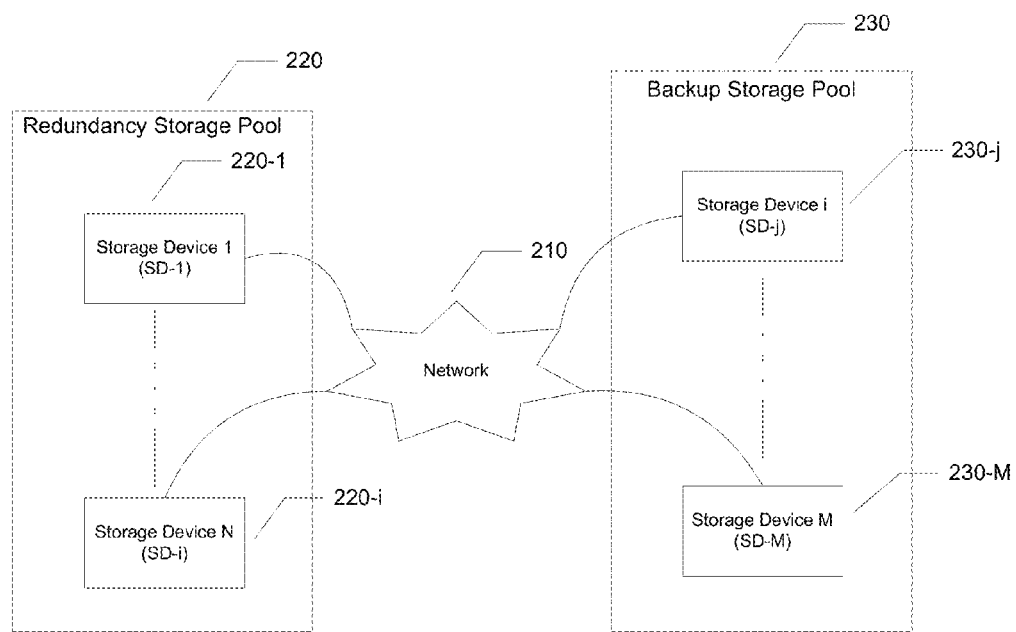
FIG. 2 illustrates a separation of a redundancy storage pool and a backup storage pool, according to some embodiments.

FIG. 2 illustrates a separation of a redundancy storage pool and a backup storage pool, according to some embodiments. In this example, one or more redundancy groups form a designated storage space for backing up redundancy data, which may be separate from storage space for backing up data. Each type of storage space may correspond to a distinct storage pool and used for backing up a certain type of data. As shown in FIG. 2, distinct sets of storage devices may form a separate redundancy storage pool 220 for backing up redundancy data and a separate backup storage pool 230 for backing up data. In this illustration, the redundancy storage pool comprises storage space from storage devices SD-1 220-1, . . . , storage device SD-i 220-i. The backup storage pool 230 is formed based on storage space from different storage devices SD-j 230-j, . . . , SD-M 230-M. In this example, although storage devices may belong to distinct storage pools, a storage device from one storage pool (e.g., SD-1 220-1) may communicate with a storage device from another pool (e.g., SD-j 230-1) via a network connection 210.

Figure 3:
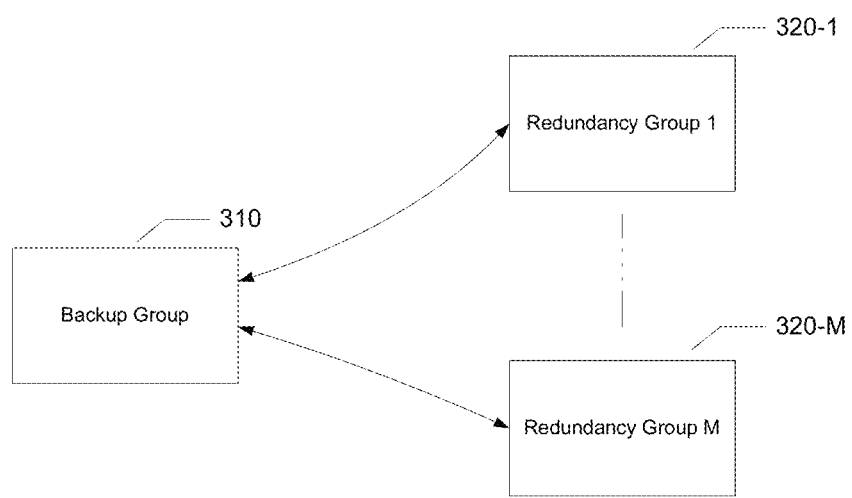
FIG. 3 illustrates an association of a backup group with one or more redundancy groups, according to some embodiments.

FIG. 3 illustrates an association of a backup group with one or more redundancy groups, according to some embodiments. In this example, a backup group 310 may be associated with one or more redundancy groups 320-1, . . . , 320-M. A redundancy group refers herein to one or more storage devices that may collectively store redundancy data. In some embodiments, a redundancy group may be designated to store redundancy data for a particular backup group. Designating redundancy group(s) to a backup group may be determined based on, for example, whether the backup group is to backup its redundancy data, the representation of the redundancy data, and how the redundancy data is used. For example, one or more erasure correcting code blocks may be used as redundancy data. An erasure correcting code refers herein to any code that is generated from multiple blocks of data that enables the reconstruction of missing data. Examples of erasure correcting codes include various parity codes, algebraic block codes such as Reed-Solomon codes, and error correcting codes such as Hamming codes. In some embodiments, when a single block of erasure correcting code is used, one redundancy group may be designated to the underlying backup group to back up its redundancy data. For example, a single parity data block is sufficient to reconstruct any single lost data block, i.e. the failure of any individual storage device in the backup group or an associated redundancy group, by bitwise exclusive-ORing N data blocks of the remaining storage devices in the backup group and redundancy group to reconstruct the lost data block. In this example, a single redundancy group may be designated to a backup group.

In some embodiments, erasure correcting codes may also provide a higher degree of protection against data loss. For example, a block-based erasure correcting code such as a Reed-Solomon code may be used. Reed-Solomon codes have the property that if K erasure correcting code blocks are derived from N data blocks as redundancy data, all data blocks may be reconstructed as long as any N data blocks can be accessed from the N+K blocks (i.e. N data blocks plus K Reed-Solomon code blocks). In some embodiments, one redundancy group may be designated to back up all K Reed-Solomon code blocks. In other embodiments, K redundancy groups may be designated to the underlying backup group so that each code block can be backed up in a different redundancy group.

Figure 4:
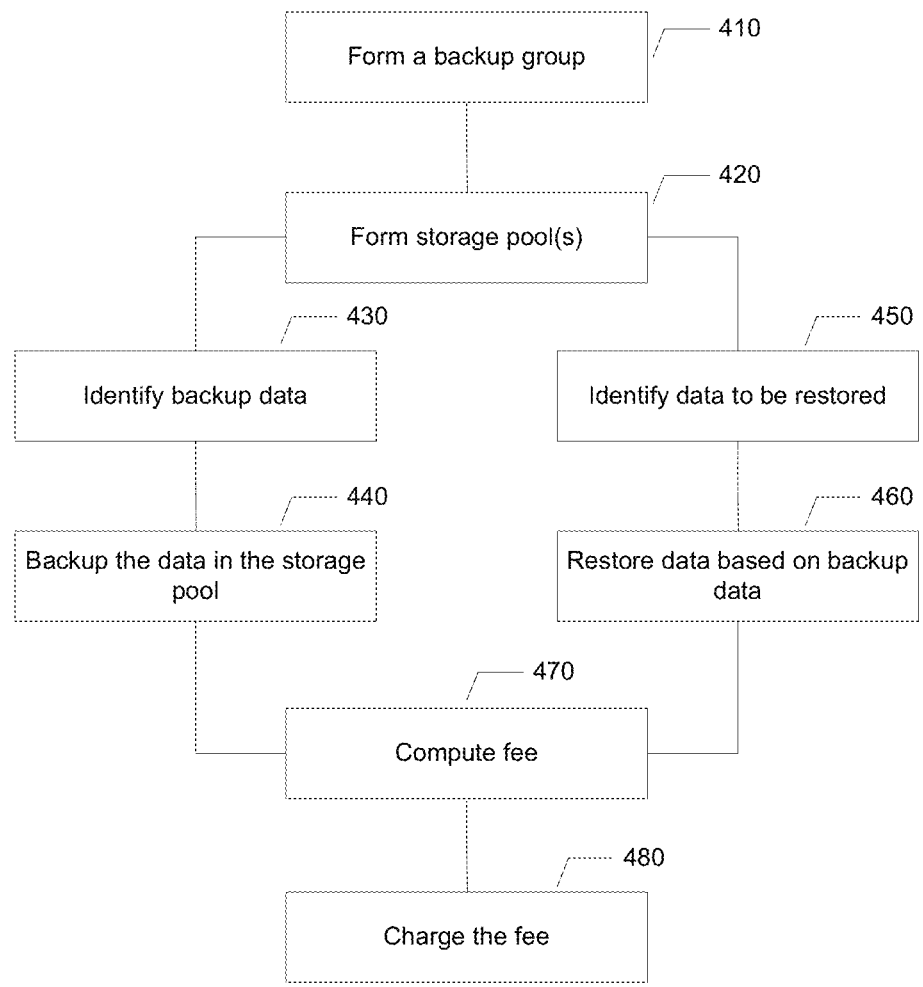
FIG. 4 is a flowchart of a process to back up and restore data, according to some embodiments.

Removable media such as DVD-R, CD-R, CD-RW, DVD-RW, or DVD+RW, as well as digital tapes, may be used in a redundancy storage pool. They may be offered with specific availability promises, for example that stored media can be made available for restoration within a particular period of time FIG. 4 is a flowchart of a process to back up and restore data, according to some embodiments. In this example, a backup group is formed at 410. Details related to formation of a backup group are discussed with reference to FIGS. 7 and 8. A storage space pool contributed by individual storage devices for backup purposes may be established, or an existing storage space pool may be used, at 420. To perform a backup operation, data to be backed up may be identified at 430. Data to be backed up may be designated through different means. In some embodiments, data to be backed up may be identified manually by a user. In some embodiments, data to be backed up may be identified by pre-configuration. For example, files generated by Microsoft Word may be configured at installation as data to be backed up. In some embodiments, data to be backed up may be dynamically determined on the fly. For instance, a file may be identified to be backed up when it has been modified since the last backup. Once identified, data may subsequently be backed up, at 440, in storage space allocated from the storage pool. Details related to backing up data are discussed with reference to FIG. 10.

In some embodiments, data may be restored based on redundancy data. To achieve data restoration, data to be restored may be identified at 450. This may be achieved via a manual process, in which a user may specify which data is to be restored. Data to be restored may also be identified automatically. For example, if it is detected that an application is in a freeze state, data related to the application may need to be restored based on the latest version of corresponding backup data. Data is then restored, at 460, based on redundancy data, which may be retrieved from storage. Details related to data restoration are discussed with reference to FIG. 33.

As described earlier, in some embodiments, a service provider may facilitate data backup services to its customers. In some embodiments, there may be a fee associated with such services. Such service fee may be charged to individual customers, which may correspond to, for example, one or more storage devices. A fee is computed at 470. Since each storage device may both use storage space of others to back up its data, for which a service charge may be imposed, and provide storage space to backup data of other devices, for which a credit may be given, computation of a fee associated with each storage device may be based on both consumption and contribution considerations. Details related to fee computation are discussed with reference to FIG. 29. The fee computed with respect to each customer may then be charged at 480.

Figure 5:
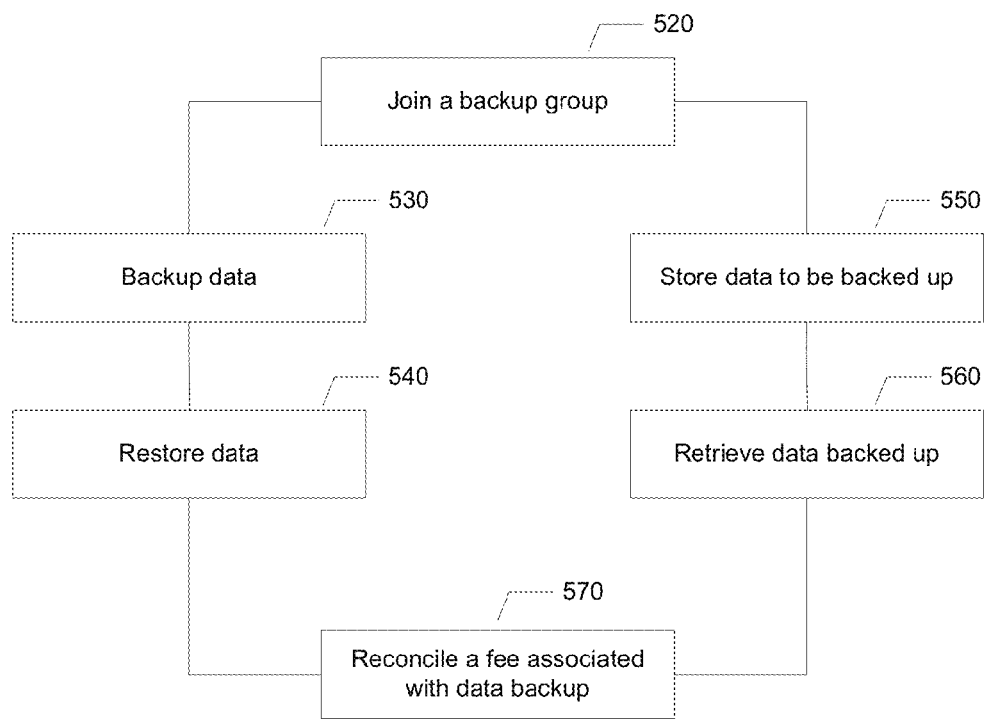
FIG. 5 is a flowchart of a backup process for a storage device, according to some embodiments.

FIG. 5 is a flowchart of a backup process for a storage device, according to some embodiments. In this example, a storage device first joins, at 520, a backup group. Depending on the mode of backup operation, a storage device may participate in backup operation through a centralized party. A centralized party refers herein to any party that may provide backup-related services to multiple storage devices. Examples of a centralized party include a designated backup manager and one or more servers associated with a backup service provider. A designated backup manager refers herein to a storage device within a backup group that provides backup-related services for other members of the backup group. Details related to a storage device joining backup operations as described herein are discussed with reference to FIGS. 7 and 8. In some embodiments, backup operations may include backing up, at 530, data of the storage device on other storage devices. Such data may also be restored, at 540, based on the backup data when it is needed. In some embodiments, a storage device may contribute its storage space to backup data for others. In this case, the storage device may store, at 550, data from other storage devices as backup data in its own storage space and retrieve, at 560, data that has been backed up when the backup data is needed. As discussed earlier, a storage device that participates in backup operations as described herein may incur a fee (including a credit) at 570.

Figure 6:
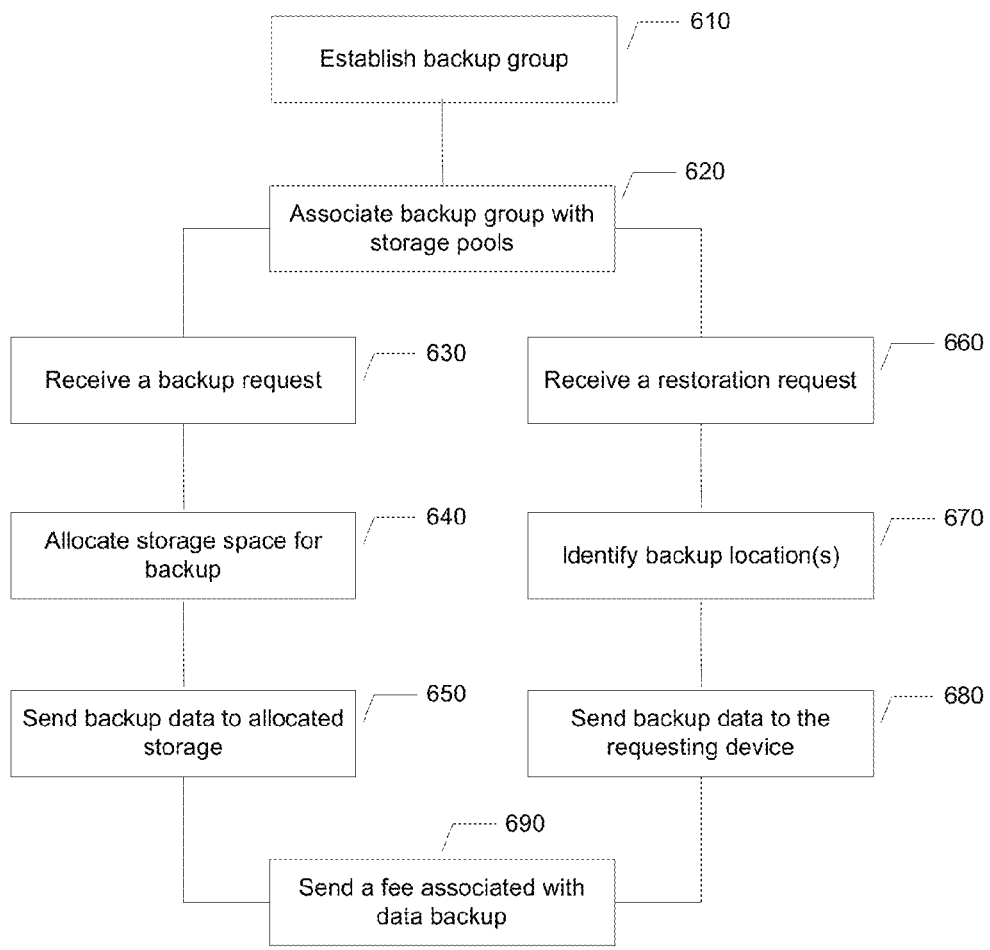
FIG. 6 is a flowchart of a process for a backup manager to direct backup operations, according to some embodiments.

FIG. 6 is a flowchart of a process for a backup manager to direct backup operations, according to some embodiments. In this example, a backup manager may establish, at 610, a backup group. Details related to formation of backup groups are discussed with reference to FIGS. 7 and 8. The backup manager may also associate, at 620, a backup group with certain storage pools. For example, the backup manager may associate a backup group with one or more redundancy groups when, for instance, the backup group requests to back up its data and/or redundancy data. In some embodiments, the backup manager may manage data backups of different backup groups and backup storages, which may include the formation and update of available backup storage pools.

In operation, the backup manager may receive, at 630, a request for backing up data. Upon receipt of such a request, the backup manager may allocate, at 640, storage space for the requested backup. In this example, allocation may include using previously allocated storage, or requesting allocation from one of more storage devices. Storage space allocated may be determined based on different considerations. Details related to storage space allocation are discussed with reference to FIG. 19. Data to be backed up may then be sent, at 650, to the storage device(s) that provides the backup storage space allocated and that subsequently stores the data as backup in the allocated storage space. An example of sending data is for a backup manager to receive and transmit the data. Another example of sending data is for a backup manager to direct a data source to send data directly to a data recipient.

In some embodiments, the backup manager may also manage data flow in the opposite direction, assisting in a restoration of data. In some embodiments, restoration involves directing the retrieval of stored data from where it was backed up, optionally directing processing the retrieved data, and making the resultant data available to the storage device for which the restoration was performed. In operation, the backup manager may receive, at 660, a data restoration request. In some embodiments, such a request may include information to be used to identify the backup data requested. Based on the received request, one or more locations where relevant data is stored may be identified at 670. In some embodiments, backup location determination may include a determination of locations where data itself is backed up and/or location(s) where the corresponding redundancy data is stored. Backup data may then be retrieved from the identified locations and sent, at 680, to the requesting storage device. An example of sending data is for a backup manager to receive and transmit the data. Another example of sending data is for a backup manager to direct a data source to send data directly to a data recipient. In some embodiments, retrieved data, which may include data and/or redundancy data, may be sent to the requesting storage device. In some embodiments, reconstruction of the requested data may be performed when, for example, data loss has been detected. In some embodiments, a backup manager may optionally send, at 690, a fee to a user associated with a storage device for which backup operations are performed. In some embodiments, a fee charging operation may be a separate operation performed by a third party, which may be associated with a backup manager.

Figure 7:
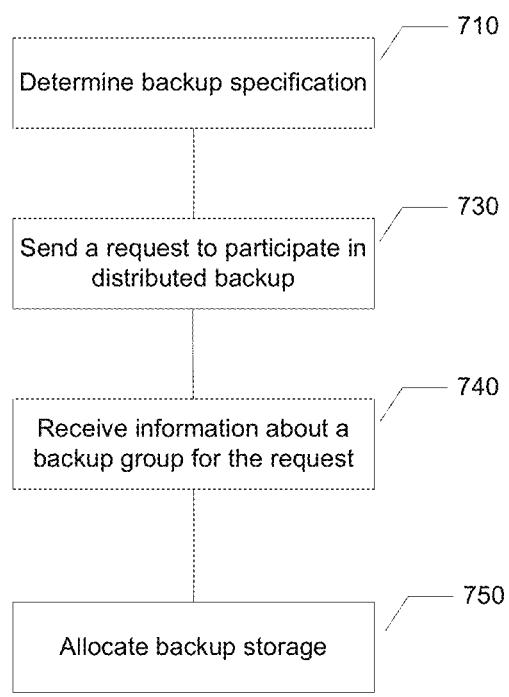
FIG. 7 is a flowchart of a process for a storage device to join a backup group, according to some embodiments.

FIG. 7 is a flowchart of a process for a storage device to join a backup group, according to some embodiments. In this example, a backup specification may be determined at 710. A backup specification refers herein to any collection of information regarding one or more backup requirements and/or resources available for backup. Examples of backup requirements include an amount of storage space desired for backup, a desired type of storage space for backing up data, a desired availability of backup space, and a desired transmission speed. Examples of information regarding resources available for backup include an amount of storage space available for backing up data, a specification of a transmission speed of the storage device's connection to a network such as an intranet or the internet, and an estimated availability of the storage device. Availability refers herein to any metric corresponding to a likelihood that data will be available, for example an estimated percentage of the time that a storage device is turned on and accessible through a network such as an intranet or the internet. An example of determining a backup specification is for a user to specify information, for example through a user interface. Another example of determining a backup specification is to retrieve parameters from configuration data, for example data associated with a backup program such as data stored in a registry. Another example of determining a backup specification is to determine some or all of the specification automatically. An example of determining an element of a specification automatically is to evaluate data to be backed up and determine one or more appropriate backup requirements such as a desired amount or availability of storage. Another example of determining an element of a specification automatically is to make a predetermined portion of free storage space available for backups, such as 30%. Another example of determining an element of a specification automatically is to evaluate historical connectivity patterns and provide an estimated availability based on the patterns. Another example of determining an element of a specification automatically is to provide information relating to a storage device's connection speed to a network such as an intranet or the internet.

To join a backup group, a storage device may send, at 730, a request for backup group membership. Backup group membership refers herein to an arrangement whereby a storage device may participate in backup operations with other storage devices, for example by backing up data within a backup group, or collectively backing up data outside the backup group. In some embodiments, such a request may include a backup specification. Depending on an operational mode, a request may be sent to various parties. In some embodiments, backup service is provided by a service provider. In this case, a request may be sent to a centralized party, such as server that facilitates the backup service. In some embodiments, data backup operation may be performed in a peer-to-peer mode. In this case, a request may be sent to one or more peer storage devices. In some embodiments, the request is sent may be sent to a designated backup manager. In some embodiments, an initial request may be sent to a server, which redirects the request to a peer storage device or a designated manager of a backup group. One example of redirecting a request is to retransmit the request. Another example of redirecting a request is to direct the requestor to send the request to a designated recipient.

In some embodiments, a storage device may be invited to sign up for backup services. In this case, instead of requesting such service, the storage device may respond to such an invitation by signing up for backup operations. A sign up process may be conducted in an interactive manner. Relevant determinations such as data to be backed up and expected quality of the backup storage may be made during such interactions. For instance, a user may purchase some hardware or software from a vendor. During installing the purchased product on a device, the vendor may pose information, for example on a computer screen, inviting the user to sign up for a data backup service. If the user accepts the invitation, additional information may be provided describing details associated with the service such as scheduled rates for different service packages, a potential reward/credit scheme associated with contributed storage space, or some price computation scheme when a user signs up for both data backup and storage contribution. To effectuate the sign-up, the user may be prompted to answer various questions and to provide information to be used in data backup operations.

After a user signs up for backup operations or accepts an invitation to sign up for such operations, information may be received, at 740, that may acknowledge the receipt of a received request or acceptance of an invitation, and/or provide information related to data backup operations. For example, such information may indicate one or more backup groups to which the storage device is designated, one or more redundancy groups that are designated to backup redundancy data for the storage device, or some identification to be used by the storage device in communications associated with any backup operations. In some embodiments, the received information may also include a service agreement, which may include, for example, various terms related to the backup service, which may be accepted between a user and a service provider.

Depending on the operational mode for data backup, information received by a storage device may be from various parties. In a centralized operational mode, information may be received from a centralized party. In a peer-to-peer operational mode, information may be received from a peer device. In some embodiments, a storage device may send a request and receive response information from another device that is designated to perform sign-up operations. In some embodiments, information received by a storage device may be used to direct the storage device to a third device for future backup operations. Examples of a third party device include a server, a backup manager, or a different peer device.

In some embodiments, storage space may be allocated, at 750. An example of allocating storage space is to allocate an amount of storage space substantially equal to an amount of storage space specified in the backup specification. Another example of allocating storage space is to allocate an amount of storage space substantially equal to an amount specified in the information received at 740. In some embodiments, allocating storage space may include marking the storage space as used, for example by creating a file such as a hidden file.

Figure 8:
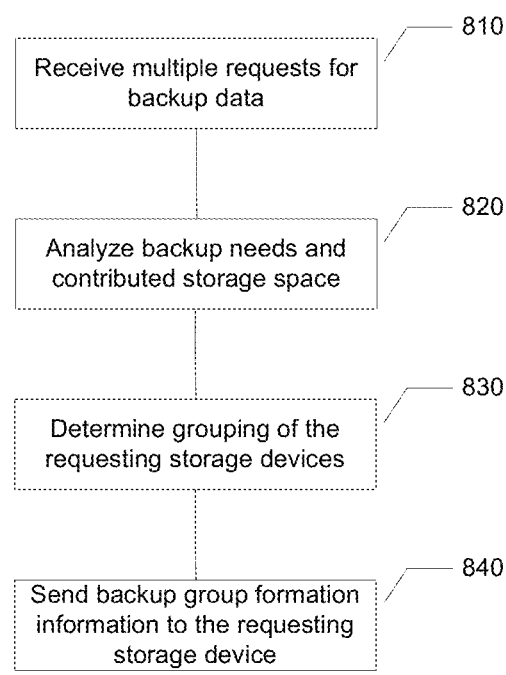
FIG. 8 is a flowchart of a process for a backup manager to form backup groups, according to some embodiments.

FIG. 8 is a flowchart of a process for a backup manager to form backup groups, according to some embodiments. In this example, requests from one or more storage devices are received at 810. In some embodiments, received requests may correspond to acceptances in response to invitations to sign up for a backup service. The requests received from storage devices may comprise backup specifications. Such information is analyzed at 820 to determine, at 830, how the requesting storage devices are to be grouped to form backup groups. Different criteria may be employed to determine groups of storage devices. In some embodiments, such determinations may be made by comparing backup requirements specified by storage devices with resources available for backup on storage devices. For example, a first storage device that desires a certain amount of high availability storage for backup may be grouped with another storage device that contributed a portion of its high availability storage space that is adequate to satisfy the amount specified by the first storage device. In another example, storage devices with similar availability requirements may be grouped together in a backup group. After storage devices are grouped into one or more backup groups, information related to each backup group may be sent, at 840, to storage devices that belong to the backup group.

Figure 9:
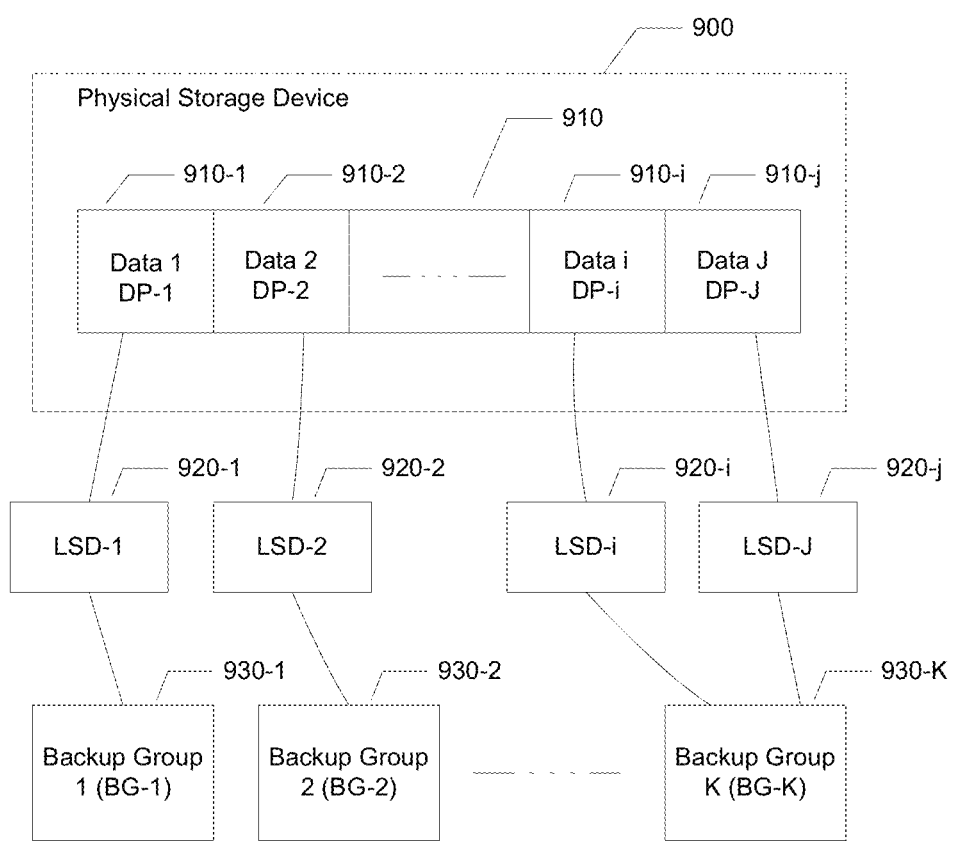
FIG. 9 illustrates a scheme in which a physical storage device can be divided into a plurality of logical storage devices, according to some embodiments.

FIG. 9 illustrates a scheme in which a physical storage device can be divided into a plurality of logical storage devices, according to some embodiments. In this example, data 910 of a physical storage device 900 may be divided into a plurality of data portions, DP-1 910-1, DP-2 910-2, ..., DP-i 910-*i*, and DP-j 910-*j*. Division of different data portions may be determined based on different considerations. For example, data with different accessibility requirements may be divided into different groups. As another example, large segments of data may be in a different data portion from smaller segments of data. In another example, data that needs to be backed up more frequently may be in a different data portion than data that needs to be backed up less frequently. In another example, data with higher availability requirements may be in a different data portion than data with lower availability requirements. In another example, data that are to be encrypted using different encryption schemes may be considered as different data portions. In some embodiments, a backup group may be formed so that it comprises multiple physical storage devices as members. For example, a laptop may be a member of a backup group so that its data may be backed up on other storage devices in the backup group. In some embodiments, a storage device in a backup group may correspond to a logical storage device.

Data portions of a physical storage device may be backed up with different requirements determined based on, for example, the nature of the underlying data. Each of such data portions may be referred to as a logical storage device and its backup may be achieved independently. In FIG. 9, DP-1 910-1 may be considered as logical storage device 1 or LSD-1 920-1, DP-2 910-2 as LSD-2 920-2, ..., DP-i as LSD-i 920-*i*, and DP-j 910-*j* as LSD-j 920-*j*. A logical storage device may join a backup group, which may or may not have another logical storage device from a same physical storage device. For instance, in the illustration, LSD-1 920-1 may be a member of backup group 1 BG-1 930-1, LSD-2 920-2 may be a member of a different backup group BG-2 930-2, LSD-i 920-*i* and LSD-j 920-*j* may belong to a same backup group BG-K 930-K. Determination of dividing a physical storage device into a plurality of logical storage devices may be made by, for example, the underlying physical storage device, or applications that generate various data portions. A determination may also be made by a device other than a physical storage device with multiple portions of data. For example, a server may divide data on a storage device into different portions based on, e.g., indicated requirements, and assign each portion to appropriate backup groups. In this case, backup data of the physical storage device may be treated, in effect, as multiple logical storage devices.

Figure 10:
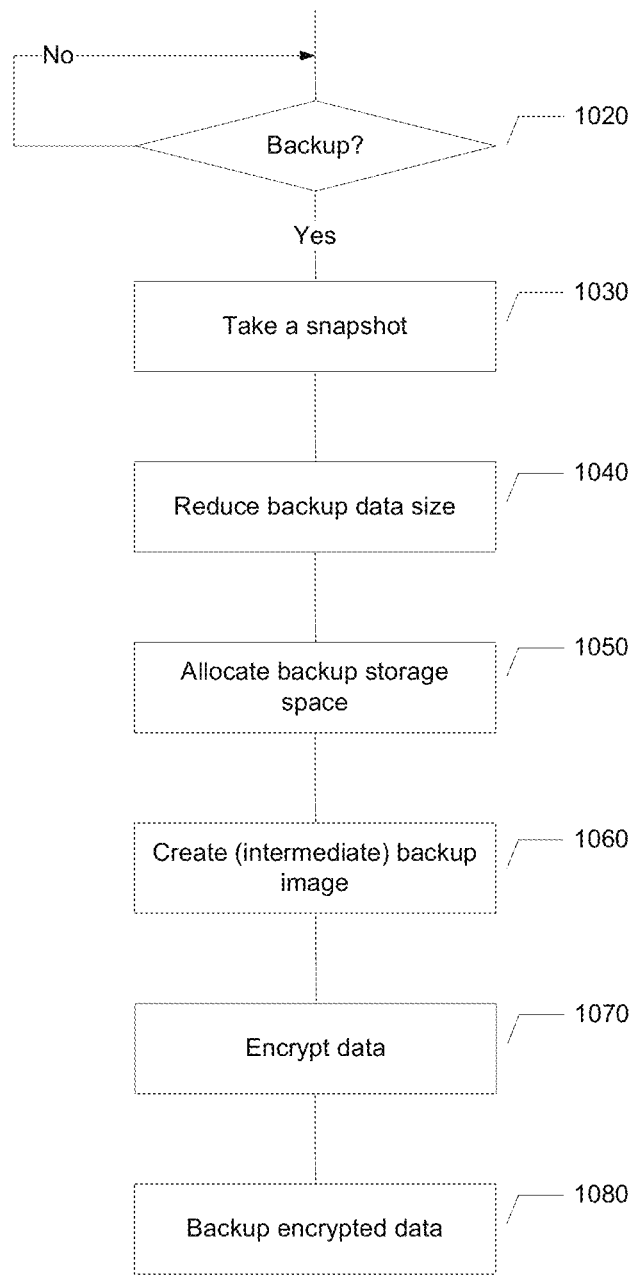
FIG. 10 is a flowchart of a process for backing up data, according to some embodiments.

FIG. 10 is a flowchart of a process for backing up data, according to some embodiments. In this example, a decision as to whether to back up data is made at 1020. Such a decision may be made based on one or more criteria, which may be pre-determined or dynamically determined. For example, it may be set up to back up data regularly according to a pre-determined interval in time. It may also be set up according to, for instance, the update status of the data to be backed up. In some embodiments, backup may be scheduled in response to the updating of data designated as data to be backed up. In some embodiments, backup may be scheduled in response to the frequency of updates being made to data exceeding a certain threshold. In some embodiments, availability of one or more storage devices involved in making a backup, such as other storage devices in a backup group or redundancy group, may be a criterion for backing up data. For example, a backup may be performed when one or more storage devices involved in making a backup are available and a pre-determined interval of time has elapsed since the last backup.

When it is determined that a backup is going to take place, a snapshot of data to be backed up is taken at 1030, in this example. A snapshot refers herein to a view of data that does not change from the time the snapshot is taken, though data can be used and modified by users and application programs. In some embodiments, a snapshot may be maintained until a time it is removed, for example after a backup image is created, or after an erasure correcting code based backup of the snapshot is superseded. Taking a snapshot refers herein to any way to create such a data view, which may be achieved via different methods known in the art. For example, on the Linux operating system, a snapshot may be taken using the lvcreate command of the LVM product created and distributed by Sistina, Inc., or using the create command of the EVMS product created and distributed by IBM, Inc., with arguments including "object, Snapshot= ..." Alternately, this could be accomplished using the techniques employed by LVM or EVMS, which are readily ascertainable by any engineer skilled in the art through examination of their source code files, which are currently available as open-source downloads.

In some embodiments, data to be backed up may be processed prior to an actual data copying operation. For example, the size of the data to be backed up may be reduced at 1040. Details related to various ways to reduce backup data size are discussed with reference to FIGS. 11-18, and FIGS. 23-28. Storage space for backing up data may be allocated at 1050. Allocation of backup storage may be performed based on a reduced data size. If data size reduction is not carried out, storage space adequate for the actual data size may be allocated. Details related to backup storage allocation are discussed with reference to FIG. 19. In some embodiments, an intermediate backup image may be created at 1060. A backup image refers herein to an image, for example a continuous image, of data elements associated with a storage device, which are to be backed up. In some embodiments, a backup image may also contain one or more references to shared data elements. Creating a continuous image of data elements to be backed up is well known to those skilled in the art, and may for example be accomplished using utilities such as tar, gzip and/or operations contained therein, which are readily available in open-source implementations. In some embodiments, a backup image may be a raw image, for example an image of a disk drive or a portion of a disk drive. Further details related to creating a backup image are discussed with reference to FIGS. 20-22. The intermediate backup image may optionally be encrypted, at 1070, to produce a backup image. In embodiments in which encryption is not used, the intermediate backup image generated at 1060 may be the backup image. The backup image may then be backed up at 1080. One example of backing up a backup image is replicating the backup image. Another example of backing up a backup image is generating and storing redundancy data, such as an erasure correcting code.

Figure 11:
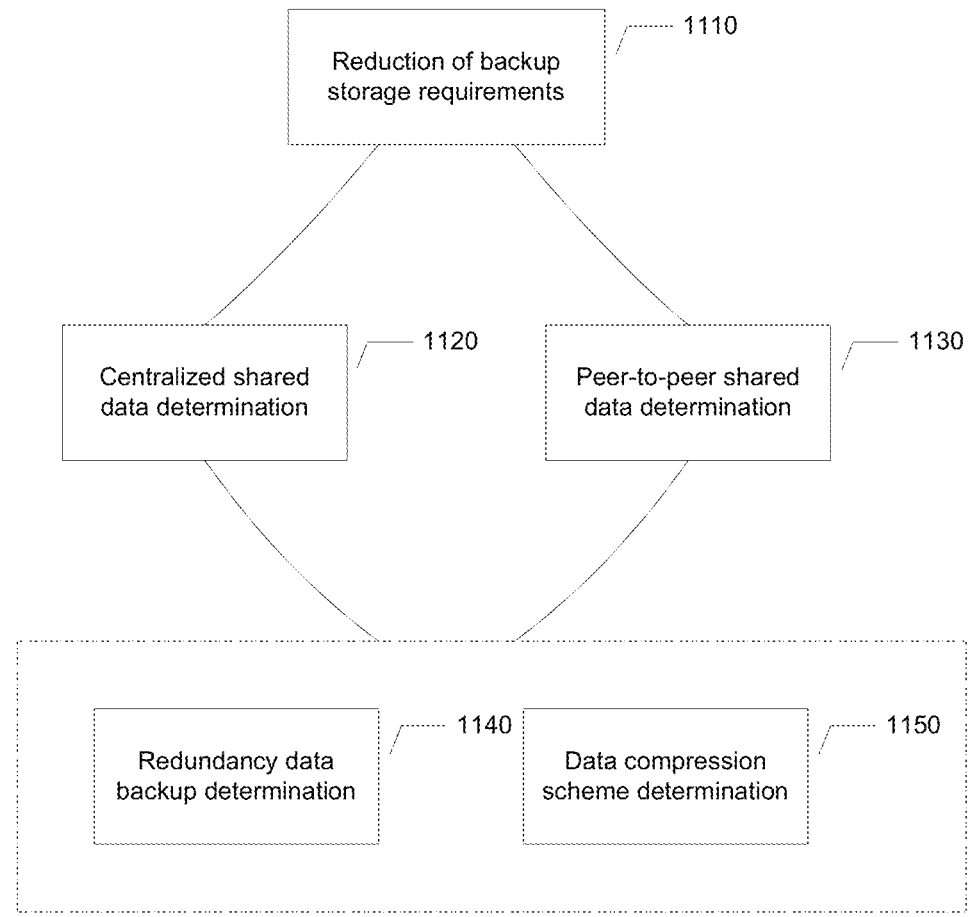
FIG. 11 illustrates a hybrid scheme to reduce storage requirements for backing up data, according to some embodiments.

FIG. 11 illustrates a hybrid scheme to reduce storage requirements for backing up data, according to some embodiments. In this example, reduction of storage requirements (1110) may be achieved at different levels of operation, such as a global level of operation and a level of operation within a backup group. For example, reduction may be achieved by identifying one or more data elements shared between or among different storage devices. A data element refers herein to a discrete unit of data such as a file or block of data. Shared data elements may be identified at different levels and may be backed up differently depending on that level. Details related to backing up shared data elements at different levels are discussed with respect to FIG. 12. Identifying data elements shared by more than one storage devices may be achieved by various means. For example, shared data elements may be identified in a centralized mode (1120) or in a peer-to-peer mode (1130). Details related to identification of shared data elements are discussed with respect to FIGS. 12-18.

Backup storage requirements may also be reduced through other means. For example, data may be compressed (1150) prior to being backed up. Different compression schemes may be applied according to some criterion. For example, to reduce backup storage requirements, a compression scheme that yields a favorable compression rate may be employed for a data image, or a data element. In some embodiments, data may be compressed before encryption. In some embodiments, data may be backed up by generating and storing redundancy data (1140). Details related to generating and storing redundancy data are discussed with reference to FIGS. 23-28.

Figure 12:
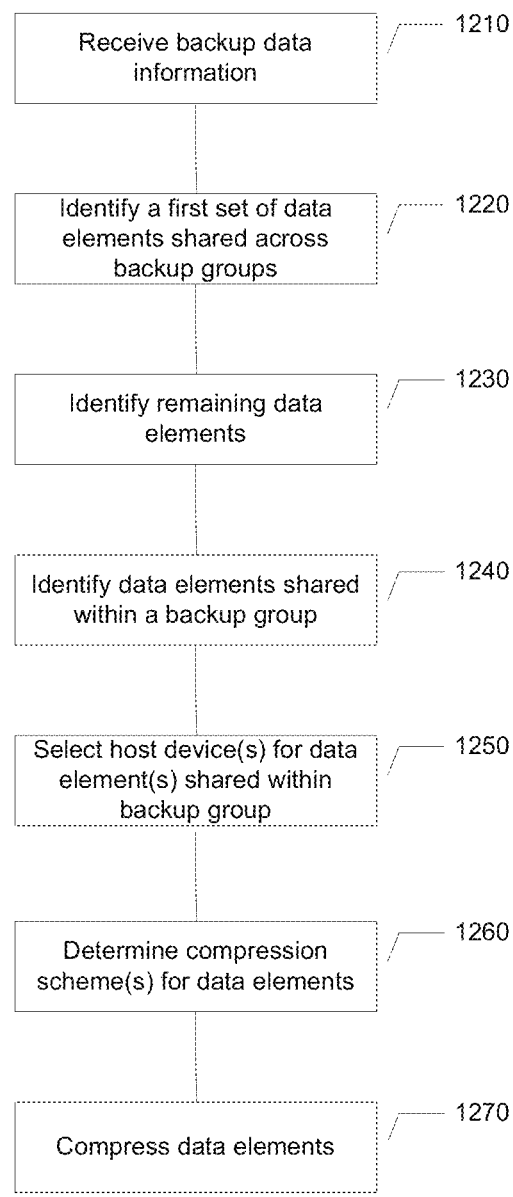
FIG. 12 is a flowchart of a process for hybrid backup storage size reduction, according to some embodiments.

FIG. 12 is a flowchart of a process for hybrid backup storage size reduction, according to some embodiments. In this example, information associated with one or more data elements of a storage device and/or backup group may be received at 1210. An example of such information is a list of identifiers, wherein the identifiers correspond to data elements and associated feature(s) of the data elements. Examples of features for data elements include checksums such as CRC checksums or cryptographic hashes such as SHA1 or MD5. In some embodiments, storage requirements to backup shared data elements may be less than storage requirement to backup unshared data elements. For example, one backup instance of a shared data element may be sufficient to assure reliable restoration for a plurality of storage devices on which the shared data element resides. In this example, shared data elements may be identified at multiple levels. A first group of one or more shared data elements may be identified, at 1220, as data that is shared across multiple backup groups. In some embodiments, a backup group may not need to backup such shared data elements, as another backup group may have provided or will provide a copy if needed for a restoration operation. Such data elements may, for example, be associated with popular applications or content, or may be determined automatically by monitoring commonly backed up data elements. In some embodiments, such a first group of shared data elements may be determined as discussed with reference to FIG. 13. Data elements remaining after selection of the first group of shared data elements may be identified at 1230. Data elements that are shared within a backup group, for example data elements that were not identified as shared at 1220, may be identified at 1240. Details related to means for identifying a shared data element are discussed with respect to FIGS. 13-18.

One or more storage devices may be selected as storage device hosts for a shared data element at 1250. An example of selecting a storage device host for a shared data element is to select a storage device on which an instance of the shared data element resides, for example a dedicated storage device for a shared data element detected at 1220 or a member of the backup group for a shared data element detected at 1240. Selection of a member of the backup group as a storage device host may be performed based on various criteria. For example, a storage device that has the most available storage space, of all storage devices in a group that have a given shared data element, may be selected to host the shared data element. As another example, a storage device that provides fastest storage access speed, or the highest expected availability, of all storage devices in a group that have a given shared data element may be selected as the storage device host for the shared data element. As another example, a pseudo random selection from storage devices in a backup group that have a given shared data element, may be used to host the shared data element. Once a host device for a shared data element is selected, non-hosting storage device(s) that share the data element may incorporate the shared data element into backup image(s) by reference, for example by using one or more identifiers. In some embodiments, a selected host device may correspond to a storage device that shares the underlying data element. In some embodiments, host selection may be performed in communication with a server that accesses a database of shared data elements across multiple backup groups. In such a centralized service, the actual data of a shared element may be backed up in a storage device that is separate from storage devices that share the data element. For example, such a separate storage device may be selected from highly available backup groups and/or data repositories such as dedicated storage servers.

In addition to reducing backup storage size requirements through identifying shared data elements, requirements may also be reduced by compressing data using a compression scheme determined at 1260. As discussed above, various considerations may be taken into account in selecting a compression scheme, for example selecting a compression scheme based on a file type being compressed, or trying various compression schemes and selecting one that provides superior results. Examples of compression schemes include Ziv-Lempel, Huffman coding, arithmetic coding, etc. Such compression techniques are well known to those skilled in the art and numerous appropriate open-source implementations may be used, such as gzip. Based on identified shared data and/or a determined data compression scheme, data size reduction may be performed at 1270.

Identifying shared data elements may be carried out via various means. In some embodiments, data elements residing on different storage devices may be compared to determine whether they are the same. In other embodiments, one or more features characterizing data elements may be computed and compared to determine whether the underlying data elements are the same. For example, one or more checksums (optionally including cryptographic hash(es) such as MD5 or SHA-1) may be used for such purposes. In this case, checksums for data elements residing on different storage devices may be computed and compared. If two data elements residing on different storage devices have the same features, the underlying data elements are shared between the storage devices, in this example. To determine whether a data element is shared among more than two storage devices, different operational modes may be employed. For example, a centralized operational mode may be adopted to determine data elements shared among a plurality of storage devices. As another example, a peer-to-peer operational mode may be used.

In a centralized operational mode, each storage device in a backup group may compute a feature for one or more associated backup data elements and send the computed features to a centralized party, which may for example include a server or a device that is designated to identify shared data elements. In a peer-to-peer operational mode, determination of shared data elements may be determined independently by all peers, or by a select group of one or more agreed upon peers. For example, each storage device may independently identify one or more data elements shared between itself and a peer storage device by, for example, receiving features of data associated with one or more other peers, for example all peers, in a backup group and then determining shared data. To facilitate such an example that includes flooding the group with information, each peer may first calculate local features of each of its data elements, and then transmit these features, directly or indirectly, to all other peers in the backup group. Indirect transmission may for example be accomplished by having some peers forward received information to other peers, in addition to their transmission of locally computed features. Such flooding may for example be done across links of a tree connecting all the members of the group, and one example of a tree is a single sequential chain containing all the members.

Figure 13:
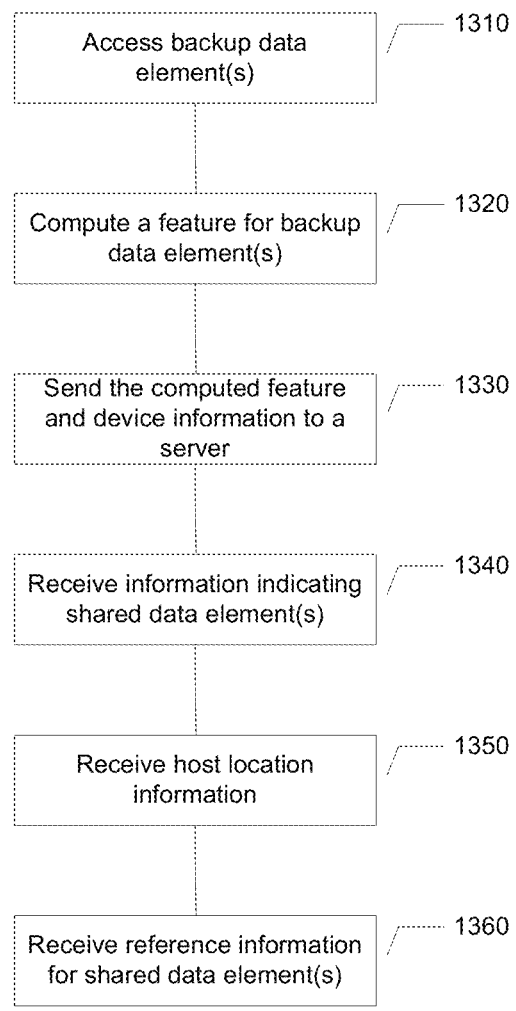
FIG. 13 is a flowchart of a process of a storage device operating in a centralized mode, according to some embodiments.

FIG. 13 is a flowchart of a process of a storage device operating in a centralized mode, according to some embodiments. In this example, one or more data elements of a storage device in a backup group are accessed at 1310. Based on the accessed data element(s), a feature, such as a checksum, that characterizes the data element is computed at 1320. Such computed features are sent, at 1330, to a centralized party, which may for example include a server or a peer device which may be designated for determining shared data elements. When shared data elements are determined by a centralized party, information related to the selected shared data elements may be sent to a storage device and received at 1340. In some embodiments, for a shared data element, additional information related to a host selected as a storage device host for the shared data element and/or a reference to be used by non-host storage device(s) to refer to the shared data element may also be received at 1350 and 1360, respectively.

In some embodiments, a centralized party may monitor features (e.g., checksums) received from different storage devices and automatically detect new data elements appropriate for sharing (e.g., new releases of popular applications software, or digital recordings of new songs by popular performers). For example, a server may maintain a list of the last n feature values (e.g., ten thousand) received and periodically identify a data element as shared when the feature value of the data element occurred more than a threshold number of times (e.g., five) in the list.

Figure 14:
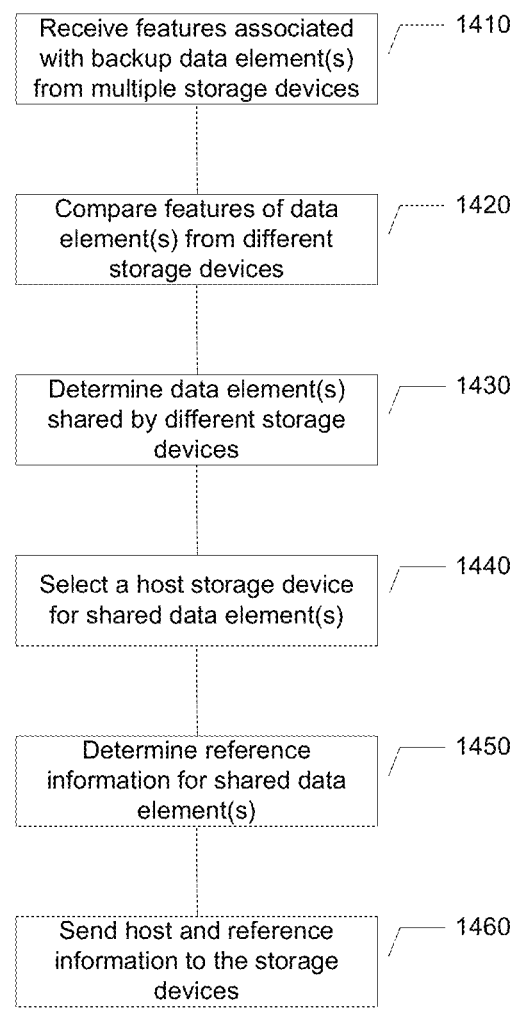
FIG. 14 is a flowchart of a process for determining shared data elements, according to some embodiments.

FIG. 14 is a flowchart of a process for determining shared data elements, according to some embodiments. In some embodiments, the method of FIG. 14 may be performed by a centralized party. In this example, features associated with one or more backup data elements are received at 1410. In some embodiments, received features corresponding to data elements from different storage devices may be compared at 1420. Based on the comparison results, data elements that are shared by different storage devices may be determined at 1430. In some embodiments, for a shared data element, a storage device host may be further selected, at 1440. An example of selecting a host is to select a host with relatively high availability from among hosts that have an instance of the shared data element. Another example of selecting a host is to select a host that is below its backup storage quota from among hosts that have an instance of the shared data element. Reference information to be used by non-hosting storage device(s) may also be determined at 1450. Such determined host and reference information may then be sent or made available, at 1460, to storage devices that share the data element.

Figure 15A:
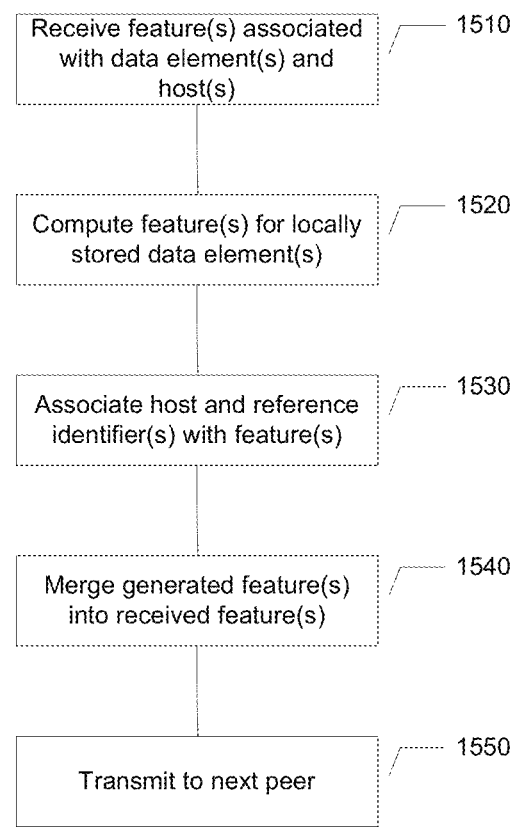
FIG. 15A is a flowchart of a first phase of a process to identify shared data elements in a peer-to-peer mode, according to some embodiments.

FIG. 15A is a flowchart of a first phase of a process to identify shared data elements in a peer-to-peer mode, according to some embodiments. In this example, a set of storage devices are ordered in an operational chain, defining a first device, a last device, and sequence of zero or more intermediate devices. A storage device may receive an association of feature(s) with hosting information at 1510. In some embodiments, hosting information may include a storage device name and a data element identifier such as a name. For example, that association may be a list, indexed by features, of such hosting information. All storage devices in the set may eventually receive such an association from a previous device, except the first device, which may use an empty association. A storage device may compute features for locally stored data elements at 1520. In some embodiments, a stored value of a feature may be retrieved based on a prior calculation. An association is created between each feature and one or more pieces of hosting information including the current storage device name and a data element identifier, at 1530. For example, a list indexed by feature, each entry of which contains such information, may be constructed. A locally generated association may be merged with the received feature association at 1540. For example, a combined list, indexed by feature, may be constructed. The merged association may be transmitted to the next peer at 1550. The last storage device in the chain may not have a next peer, and may instead transmit the combined association in this phase to the first storage device in the chain, which may initiate a second phase, as discussed in conjunction with FIG. 15B.

Figure 15B:
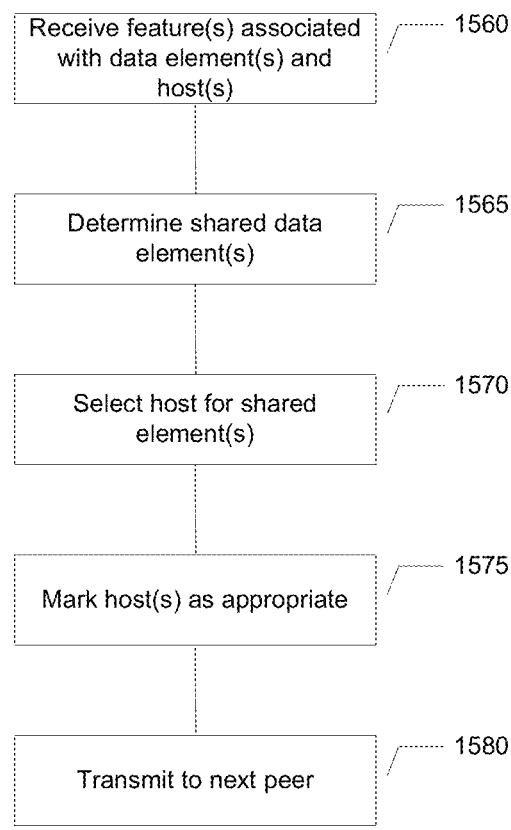
FIG. 15B is a flowchart of a second phase of a process for identifying shared data elements, in a peer-to-peer mode, according to some embodiments.

FIG. 15B is a flowchart of a second phase of a process for identifying shared data elements, in a peer-to-peer mode, according to some embodiments. In this example, an association between features and hosting information is received at 1560. As discussed in conjunction with FIG. 15A, the first storage device may receive such an association from the last storage device, for example at the end of a first phase. A storage device may determine shared data element(s) at 1565. For example, all associations with locally calculated features may be examined to determine if one or more other storage devices have one or more data elements with identical features. As a second example, hosting information may be examined to determine if the current storage device is associated with hosting information associated with a feature, and if in addition there is other hosting information associating an alternate storage device with that feature. As a third example, all shared data elements may be identified from the association. A storage device may be selected to host shared data element(s) at 1570. As an example, hosting may be selected to match the selection made by a previous storage device, for example as will be marked in 1575. As another example, hosting may be specified to be done by randomly selecting, for each shared data element, one of the storage devices that has that shared data element. As a third example, the selected host for a shared data element may be the storage device that, based on existing associations, possesses the data element and that has the fewest current hosting assignments, or has the lowest volume of aggregate hosting assignments. The association may be augmented to include a marking of the selected host at 1575. For example, features for which a host has been selected may be additionally associated with information including a storage device that will host the data element. The augmented association may be transmitted to the next peer at 1580. The last storage device has no next peer, and this second phase may be complete when that storage device has completed its augmentation at 1575.

Figure 16:
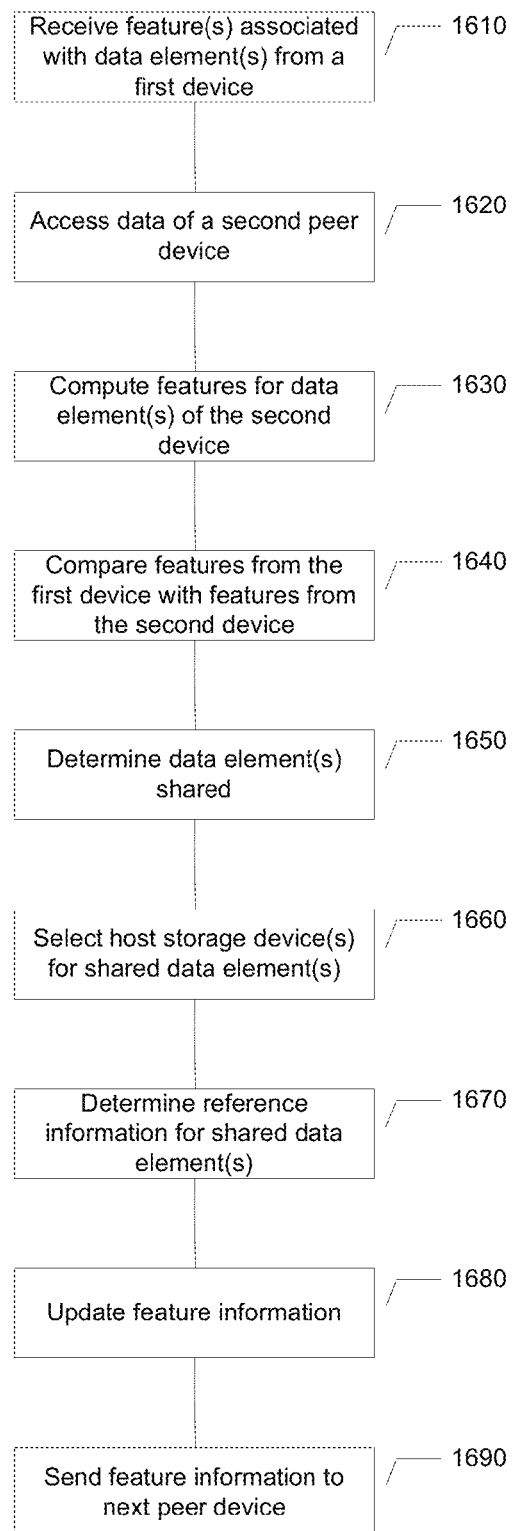
FIG. 16 is a flowchart of a process to determine shared data elements in a peer-to-peer mode, according to some embodiments.

FIG. 16 is a flowchart of a process to determine shared data elements in a peer-to-peer mode, according to some embodiments. In this example, features associated with data element(s) are received, at 1610, by a second storage device from a first storage device. In some embodiments, a feature may be associated with a storage device, wherein the storage device has an instance of a data element associated with the feature. In some embodiments, for example when the process is being initiated, an empty set may be initialized instead of receiving an initial set of features. To determine whether there is a shared data element, data elements of the second storage device may be accessed at 1620 and features corresponding to such data element(s) may be computed at 1630. In some embodiments, previously computed features may be stored, and such features may be retrieved rather than being re-computed. Features received from the first storage device are then compared with features computed, at 1640, to determine, at 1650, shared data element(s). In some embodiments, for a shared data element so determined, a host may be selected, at 1660, and corresponding reference information may be determined, at 1670. In some embodiments, selecting a host may include using a host associated with a data element in the feature set. The feature associations may be updated, at 1680, for example by adding computed features for one or more data elements for which an instance is stored at the second storage device, and/or by adding hosting information. The updated set of features and associations may be sent to a next storage device, for example a storage device in the same backup group as the first and second storage devices. An order of storage devices in a backup group may be established in various ways. One example of establishing an order of storage devices is to use the order in which they were added to a backup group. Another example of establishing an order of storage devices is to order them by availability, such as highest to lowest. Another example of establishing an order of storage devices is to order them by available storage space, for example most to least. In some embodiments, for example when all storage devices in a backup group have performed the operation, the updated set of features may not be transmitted to a next storage device at 1690.

Figure 17:
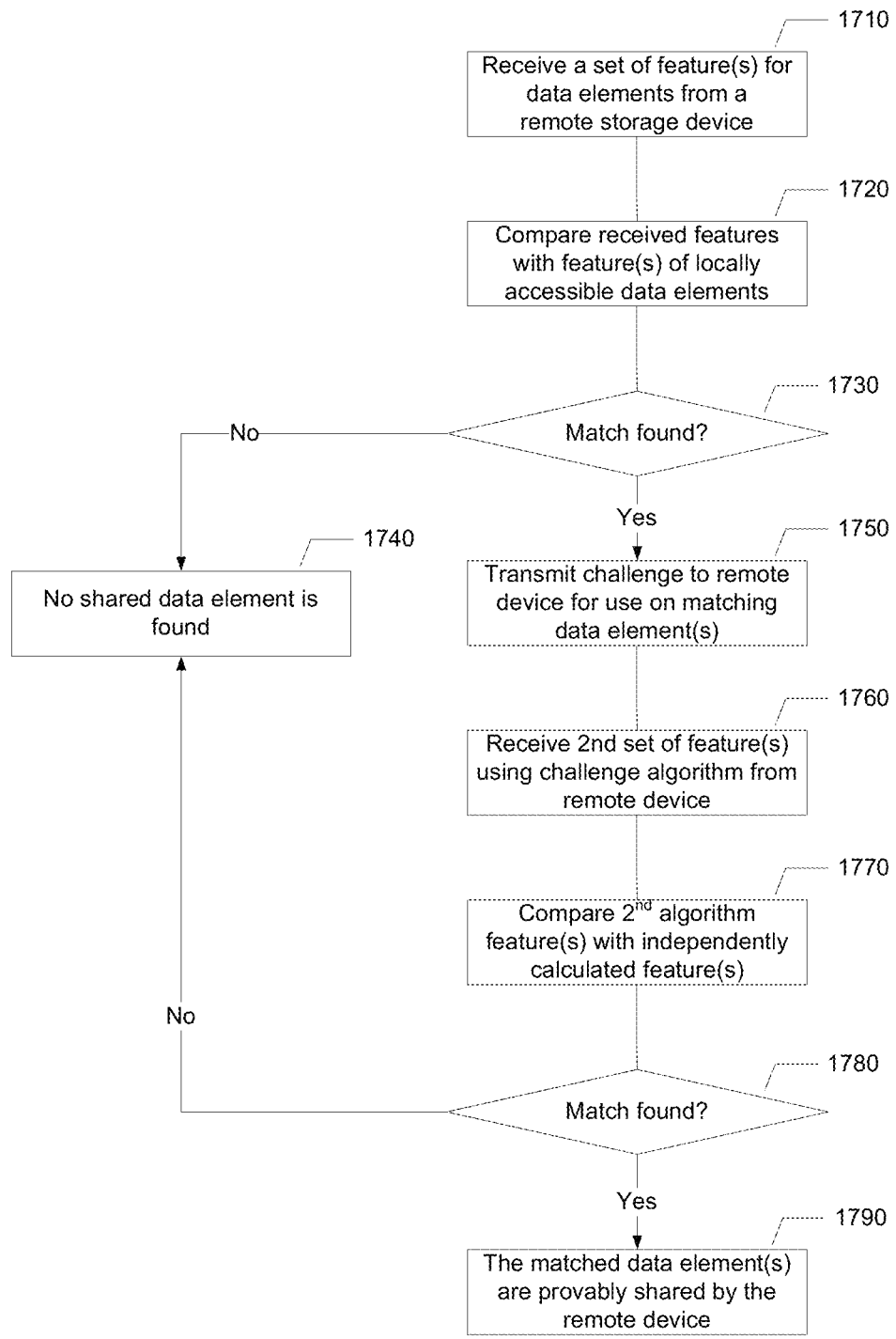
FIG. 17 is a flowchart of a process to provably identify shared data elements, according to some embodiments.

FIG. 17 is a flowchart of a process to provably identify shared data elements, according to some embodiments. In this example, a set of features for data elements may be received from a remote storage device at 1710. For example, in a peer-to-peer mode, such as was discussed in conjunction with FIGS. 15*a* and 15*b*, these features may be provided in a received association, such as a list of features associated with names of storage devices that purport to posses a corresponding data element. In another example, in a centralized mode these features may be provided to a server, for example as part of a request for backup service. The received features may be compared with features calculated for locally accessible data elements at 1720. For example, in a peer-to-peer mode a comparison with features on locally possessed data elements may be performed. In another example, in a centralized mode, a comparison with features associated with one or more other storage devices may be performed. If no match is found at 1730, then no shared data element is found, in this example. If a match is found at 1730, then a challenge is sent to the remote device in this example. An example of a challenge is an algorithm and/or key for use in computing one or more additional features on the matching data element(s) at 1730. For example, an algorithm may be a hashing function, such as a cryptographic hash (for example, an MD5 or SHA1 hash), and a key may be a locally generated pseudo random value. In some embodiments (not shown), a remote storage device or a party affiliated with the remote storage device may compute the requested feature for the data element using the challenge, and return the resulting feature. For example, if the challenge is a hash and a key, the remote device may combine the supplied key with the matching data element, for example by appending the key to the data element, and hash the aggregate into a result. One or more results may be combined together into a second set of one or more features and sent as a response to the challenge. The second set of features may be received from the remote device at 1760. The second set of features may be compared with an independent calculation of one or more features at 1770. An example of an independent calculation of a feature is a calculation of the feature performed locally, using an instance of the data element held by a local storage device, in conjunction with the challenge. Another example of an independent calculation of a feature is a calculation of the feature on a previously obtained copy of the data element. Another example of an independent calculation of a feature is to receive a calculation of the feature by a remote storage device that has requested backup services for the matching data element. If a match is not found between the second set of features and the independently calculated feature(s) at 1780, then no shared data element is found in this example. If a match is found between the second set of features and the independently calculated feature(s) at 1780, then the matching data element is provably shared with the remote device at 1790 in this example.

In some embodiments, it may be determined that a data element is provably shared by a remote storage device before the remote storage device may incorporate the data element by reference in a backup image. In some embodiments, it may be determined that a data element is provably shared by a remote storage device prior to providing (or facilitating) restoration service of the provably shared data element to the remote storage device. Such a determining storage device may include a centralized server, or a peer storage device.

Figure 18:
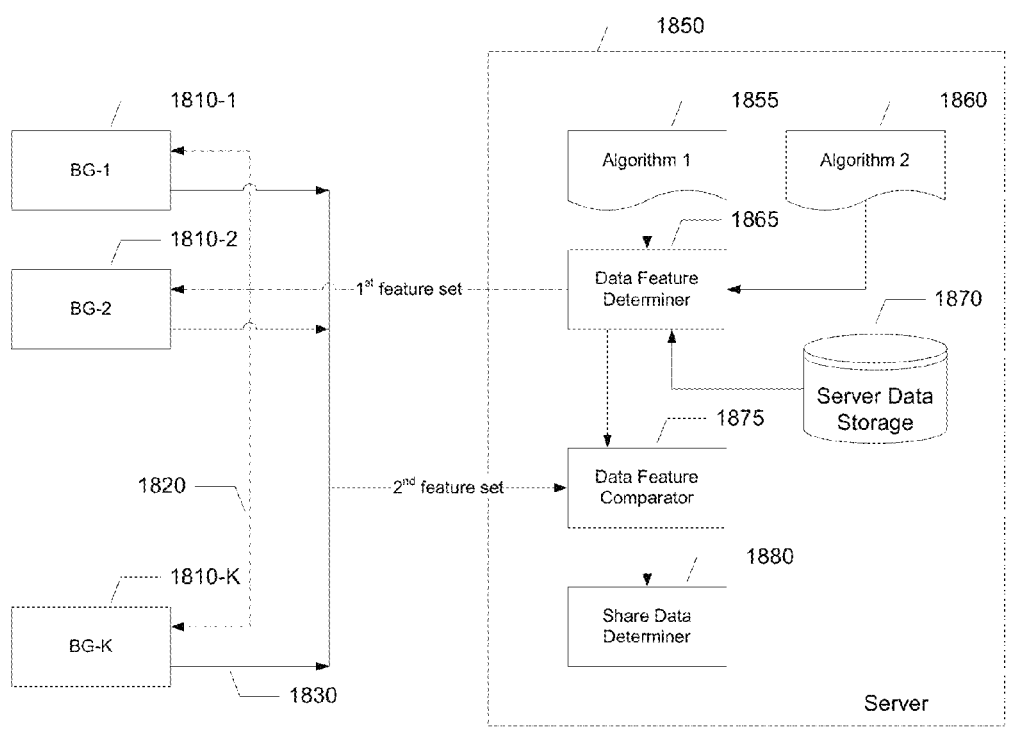
FIG. 18 depicts a scheme to identify shared data elements, according to some embodiments.

FIG. 18 depicts a scheme to identify shared data elements, according to some embodiments. In this example, data elements stored on a server 1850 are compared with data elements stored on a plurality of backup groups, 1810-1, 1810-2, . . . , 1810-K, or storage devices (not shown) to determine whether there exist one or more shared data elements between the server 1850 and individual backup groups. In some embodiments, the server may comprise a server data storage 1870, a data feature determiner 1865, a data feature comparator 1875, and a shared data determiner 1880. Various data files may be stored on the data storage 1870. The data feature determiner 1865 may compute features for data elements stored on the server according to an algorithm, such as an algorithm 1 1855 or an algorithm 2 1860. Examples of algorithms include checksums such as CRC and cryptographic hashes such as MD5 and SHA1. In some embodiments, an algorithm 2 1860 may include use of a key as data for use in computation, for example a pseudo random key may be generated by the server 1850 and included as input data to the algorithm 2 1860. In some embodiments, a unique key is generated for each feature calculation using algorithm 2. In some embodiments, a unique key may be used for one or more feature calculation, for example, using a single key for all challenges sent to a specific storage device in a single transmission. In some embodiments, the calculations involved by algorithm 2 are performed in one or more storage devices, and are optionally verified via recomputation or comparison in the server 1850. The data feature comparator 1875 may compare two or more sets of features and determine what (if any) features are present in more than one set. The shared data determiner 1880 may determine data shared between the server 1850 and any of the backup groups based on the comparison result from the comparator 1875. Each of the backup groups may also have similar components as described for the server (not shown), each of which may facilitate similar functions as described above.

In operation, the server 1850 may send a first set of features 1820, computed by the data feature determiner 1865 for one or more data elements stored in the server data storage 1870 according to the algorithm 1 1855, to one or more backup groups. Upon receiving the first set of features, each recipient backup group may compute feature(s) for its data elements using the algorithm 1 and determines matched data elements by comparing two sets of features. When a match is found on a backup group, a second set of features 1830 for the matched data elements are computed using the algorithm 2, optionally including a key provided by the server 1850, and sent to the server 1850. The data feature determiner 1865 may then compute corresponding features for its data elements using the algorithm 2 1860. In other embodiments, a data determiner (not shown) associated with a host storage device for the feature may compute the corresponding feature(s) and send them to the server. The second set of features may be compared with the computed features. Shared data elements may then be identified from each match by the shared data determiner 1880. In some embodiments, the double check scheme described herein may be carried out between two peer storage devices.

Figure 19:
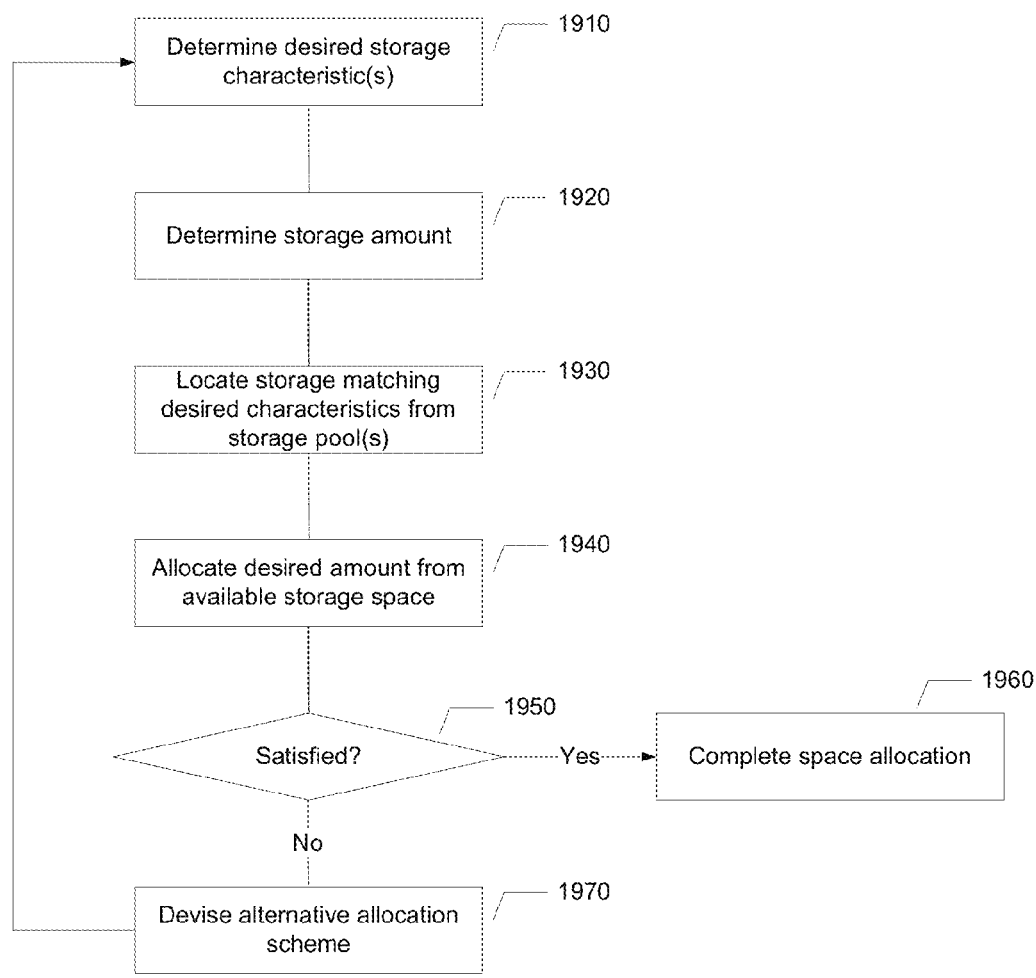
FIG. 19 is a flowchart of a process to allocate backup storage space, according to some embodiments.

FIG. 19 is a flowchart of a process to allocate backup storage space, according to some embodiments. In this example, one or more characteristics desired for redundancy storage space may be determined at 1910. In some embodiments, characteristics may include characteristics associated with a backup group, such as a desired availability, geographical location or communications speed. In some embodiments, characteristics may include characteristics associated with data to be backed up, such as an amount of storage desired. In some embodiments, characteristics may include characteristics associated with a type of redundancy data. An example of a characteristic associated with a type of redundancy data is that redundancy data for replicating one or more backup images may be allocated from one or more storage devices within the backup group in which the data originates, while redundancy data generated using an erasure correcting code may be allocated from one or more storage devices outside the backup group in which the data originates. In some embodiments, for example when both replicated and generated redundancy data are to be stored, multiple storage allocations with different characteristics may be made. An amount of storage space matching characteristic(s) of desired storage for corresponding data to be backed up may be determined at 1920. Such determined information may then be used to locate storage matching the characteristic(s) from corresponding storage pool(s). An available storage of the desired type may be located, at 1930, from a backup storage pool. An amount of storage space in such located storage space may then be allocated at 1940.

In some embodiments, storage may be allocated by a server that is designated to control the allocation of space. In some embodiments, allocation may be performed by a broker designated for the backup group. In other embodiments, allocation may also be done through peer-to-peer communication with storage devices that have one or more backup storage pools.

If the amount of backup storage space needed is fully allocated, determined at 1950, backup storage space allocation is completed at 1960. In some situations, an identified storage may not have enough storage space available to provide an adequate amount of storage space desired. In this case, allocated storage space may be able to store only a portion of data to be backed up. When a desired amount of storage space is not allocated, an alternative storage allocation scheme may be sought at 1970. In some embodiments, if an allocation was made in preparation for use, it may be released. In some embodiments, an alternative storage allocation scheme may be derived based on some tradeoffs. In some embodiments, tradeoffs may be made in terms of quality versus storage. For example, if a backup group requires a very high degree of availability but insufficient high-availability redundancy storage space is available, the requisite availability may be traded off by obtaining additional lower-availability redundancy storage, which may improve the likelihood that sufficient redundancy data blocks are made available so that data restoration may be effectively performed when needed. In this example, after an alternative storage allocation scheme is devised, the process returns to 1910 so that another round of storage allocation for additional storage for backing up remaining data may take place with updated allocation parameters.

Figure 20:
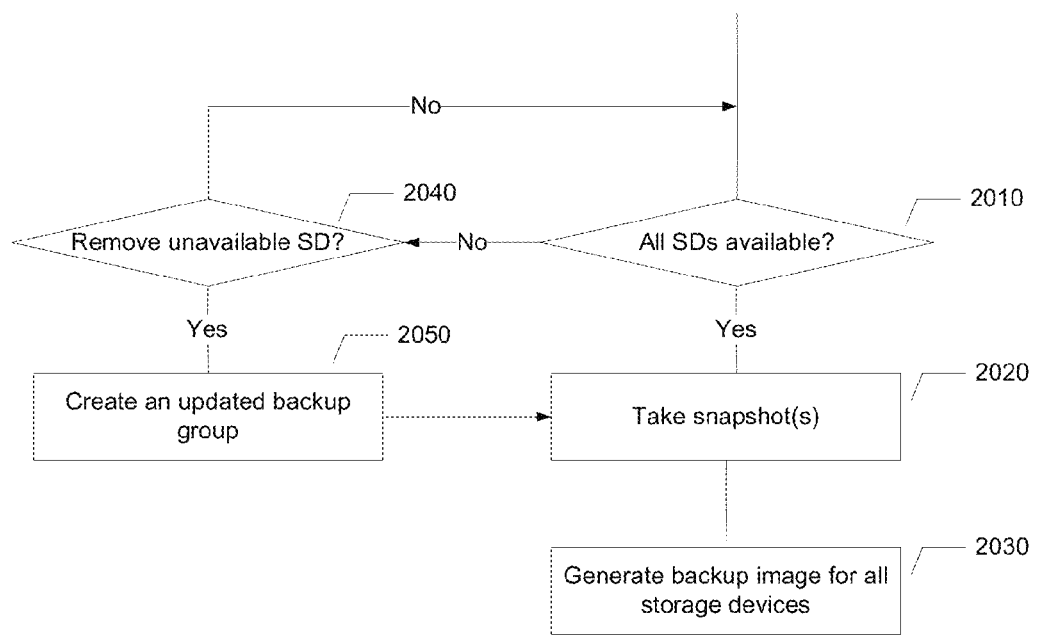
FIG. 20 is a flowchart of a process to create one or more backup images, according to some embodiments.

FIG. 20 is a flowchart of a process to create one or more backup images, according to some embodiments. In this example, creation of backup images may be achieved under different conditions. In some embodiments, all storage devices in a backup group may be required to be available at the time backup images are created. In such embodiments, backup image creation may be postponed until all relevant storage devices become available. In some embodiments, availability of all storage devices may not be required. In those embodiments, when one or more storage devices are unreachable, an updated backup group may be created that does not include the unreachable device(s) and then backup images may be created for the updated backup group. Different embodiments of creating backup images are illustrated in FIG. 20. When all storage devices of a backup group are available, determined at 2010, a snapshot is taken, at 2020, prior to generating, at 2030, a backup image for storage devices in the backup group. If not all storage devices are available, it is first determined, at 2040, whether it is permitted to remove the unreachable storage devices. An example of determining whether removal is permitted is to enforce a hard-coded policy. Another example of determining whether removal is permitted is to check a policy associated with a backup group. If such removal is not permitted, a backup image is not created until all storage devices are available, at 2010. If it is permitted to create a backup image based on available storage devices, an updated backup group is created at 2050 in this example, by removing the unreachable storage devices. Details related to generating an updated backup group are discussed with reference to FIG. 21. To create a backup image for the updated backup group, a snapshot may be taken at 2020 prior to generating, at 2030, a corresponding backup image for storage device(s) in the updated backup group.

Figure 21:
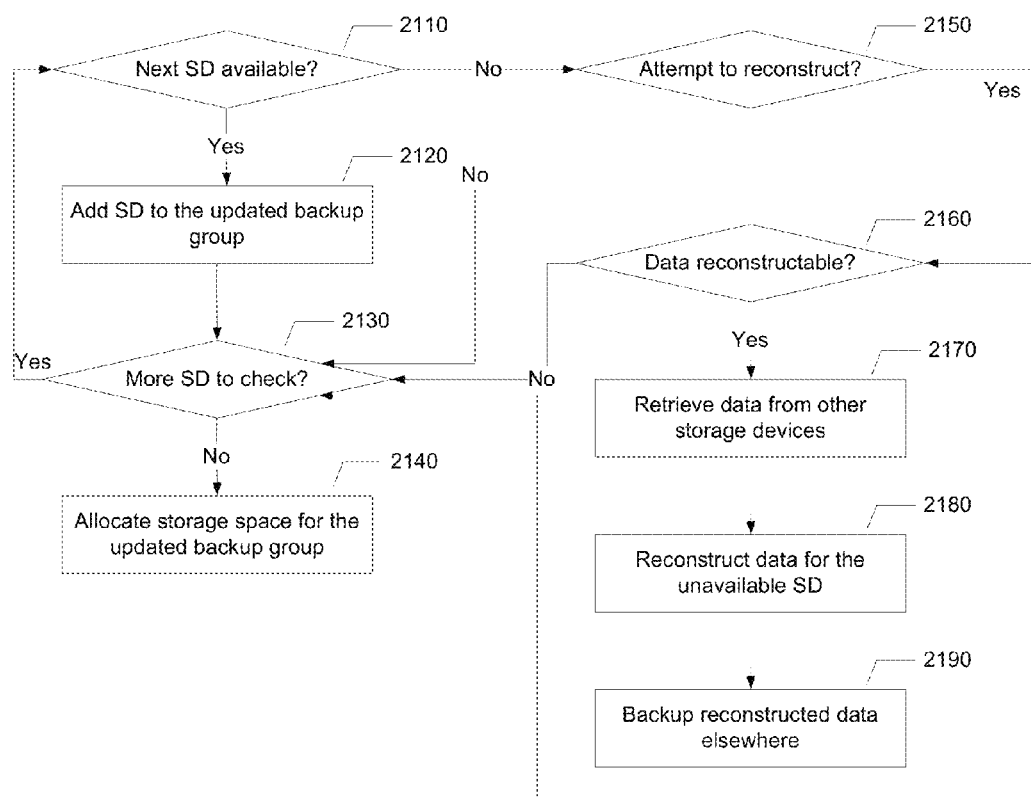
FIG. 21 is a flowchart of a process to generate an updated backup group, according to some embodiments.

FIG. 21 is a flowchart of a process to generate an updated backup group, according to some embodiments. In this example, availability of a storage device in a backup group may be examined to determine whether an updated backup group includes the storage device. If a storage device is available, determined at 2110, the storage device may be added to the updated backup storage at 2120. In some embodiments, data contained on an unavailable storage device may be reconstructed from the data on other storage devices and/or redundancy storage. Such reconstructed data may be backed up, within or outside of the backup group to which the unavailable storage device had belonged. When a storage device is not available, it is determined, at 2150, whether reconstructing data of the unavailable storage device is to be attempted in this example. An example of determining whether to reconstruct data of the unavailable storage device is to enforce a hard-coded policy. Another example of determining whether to reconstruct data of the unavailable storage device is to check a policy associated with a backup group. If it is determined to attempt to reconstruct such data, it is further determined in this example, at 2160, whether reconstruction is feasible. For example, at the time of the removal, a storage device on which redundancy data of the removed storage device is stored may be inaccessible. Another example is that a storage device in the same backup group that is designated to reconstruct data for member storage devices may be temporarily busy. When data of the unavailable storage device can be reconstructed, data of the unavailable storage device backed up on one or more storage devices may be retrieved at 2170 and used to reconstruct, at 2180, data of the unavailable storage device. Such reconstruction may be performed peer-to-peer by the storage devices in the backup group and/or associated redundancy group, or may be performed by a central server. In some embodiments, such reconstruction may also involve generation of a backup image from redundancy data, for example using an erasure correcting code.

Reconstructed data may then be backed up, at 2190, for example in the same backup group or elsewhere. In some embodiments, to obtain storage for backing up an unavailable storage device, a separate redundancy storage allocation may be made and dedicated to the unavailable storage device for data backup. In this example, the process of creating an updated backup group may continue until all storage devices have been processed, determined at 2130. Once the updated backup group is created, storage space desired for the updated backup group may be allocated at 2140. This operation may take place when an original storage space desired for backing up is different from a storage space amount desired by the updated backup group. For example, when data for unavailable storage devices have been reconstructed and backed up elsewhere, such data may no longer need to be backed up as part of the updated backup group.

Figure 22:
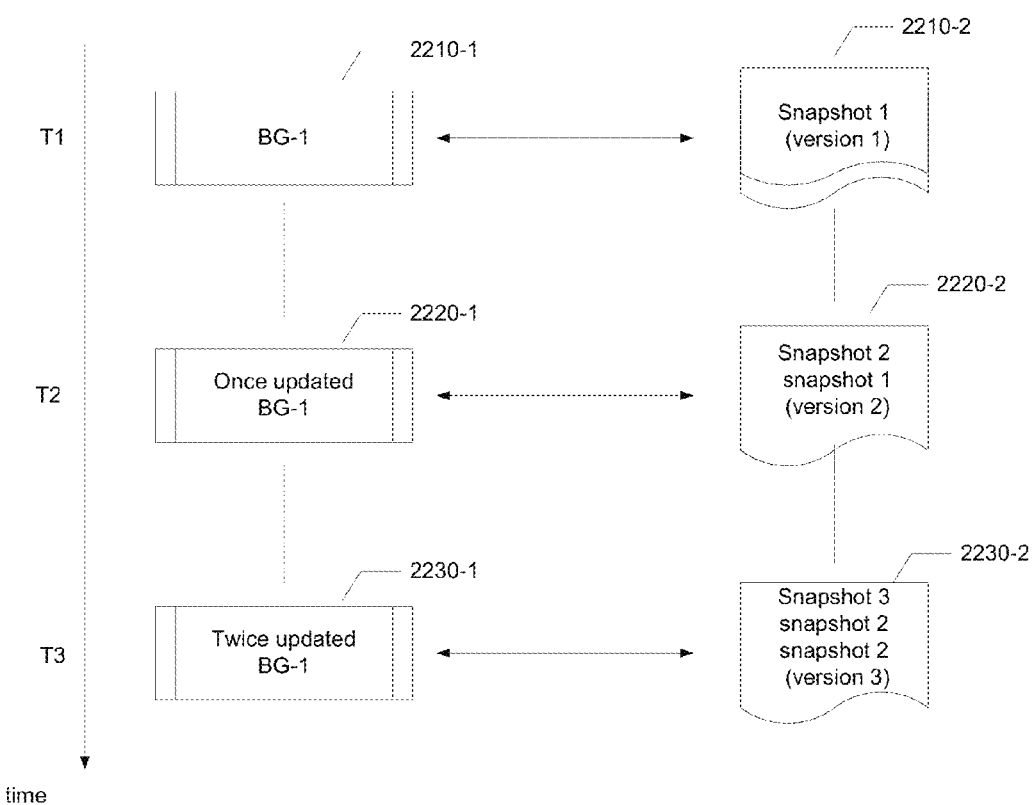
FIG. 22 illustrates a scheme to use an additional snapshot during a backup operation when a group member is not available, according to some embodiments.

FIG. 22 illustrates a scheme to use an additional snapshot during a backup operation when a group member is not available, according to some embodiments. In this example, when a storage device is unavailable for backup image creation, other storage devices in the backup group may not release the snapshots made at the time of the last backup image creation. In such situations, rather than releasing a snapshot after creating new snapshots, available devices may create an additional snapshot, and corresponding additional backup images may be created. Using the backup image(s), additional redundancy data may be generated. Storage may be allocated for the additional redundancy data, and that data may be stored. This may result in multiple snapshots and redundancy data associated with a backup group, facilitating the capability to restore one or more backup images (reflecting various points of time when they were constructed) to subsets of the storage devices in a backup group. In FIG. 22, a backup group BG-1 2210-1 creates a snapshot 2210-2 (or version 1 of its data) at time T1. At time T2, the BG-1 is updated to form a once updated BG-1 2220-1 for which a snapshot 2 2220-2 is taken (for accessible storage devices), and the first snapshot may be retained along with the second snapshot. This updated backup group is then further updated at T3, creating a twice updated BG-1 2230-1, with a snapshot 3 2230-2.

In some embodiments, a previous backup image may be retained during the creation of a backup image. For example, a second set of snapshots may be created on a backup group's storage devices while a first set of snapshots is still in place. A new set of backup image(s) may be created from the second set of snapshots, redundancy data may be calculated and stored, and the first set of snapshots may be released. In some embodiments, whether to release snapshots may depend on, for example, specific policies employed and/or availability of devices within a backup group. As an example, a policy may specify that if daily backups are carried out, snapshots may be retained. As another example, if a storage device in a backup group is absent and data of the storage device is to be reconstructed later, a snapshot may be retained. In some embodiments, a new allocation may be made from a redundancy storage pool. The first associated redundancy group may be released after a backup is performed using the new redundancy group. In some embodiments, there may be multiple levels of redundancy (e.g., in situations where loss of multiple data blocks is recoverable). Such multiple levels of redundancy may be used to create redundancy data for an updated backup image. In some embodiments, a backup group may be configured (e.g., at the time of forming the backup group, or subsequent modifications made thereto) to maintain multiple backup images (e.g., daily backup images for a week and weekly images for a month).

In some embodiments, backup image creation may be triggered when a backup group is formed. In some embodiments, backup image creation may be triggered after a backup group is formed according to one or more criteria. For example, it may be triggered based on a regular schedule (e.g., every day at 3:00 am) or dynamic situations such as when the amount of data that has been changed exceeds a certain threshold. Backup image creation may also be triggered in an opportunistic manner. For example, it may be activated when some members of the underlying backup group become available. In some embodiments, a combination of such criteria may be used. For example, a backup image may be created when storage devices in a backup group and its associated redundancy group are available, if it has been more than a threshold period of time such as a day since the last image was created.

In some embodiments, multiple redundancy groups may be created to preserve the capability to restore unavailable storage devices. In some embodiments, when a previously unavailable storage device becomes available, older snapshot(s) and/or redundancy group(s) may be released. In some embodiments, when a previously removed storage device is available, the now-available storage device may be reincorporated into the backup group, or assigned to a new backup group. In some embodiments, if a storage device is identified as regularly unavailable, it may trigger a reevaluation of its availability, which may result in a downgrade of its storage, for example, banning the device from the redundancy storage pool, assigning it to a lower-availability backup group (e.g., one that does not guarantee high availability restoration capabilities), charging a fee to a user whose storage device has not met its availability commitment, and/or banning a storage device or user from a backup service.

Figure 23:
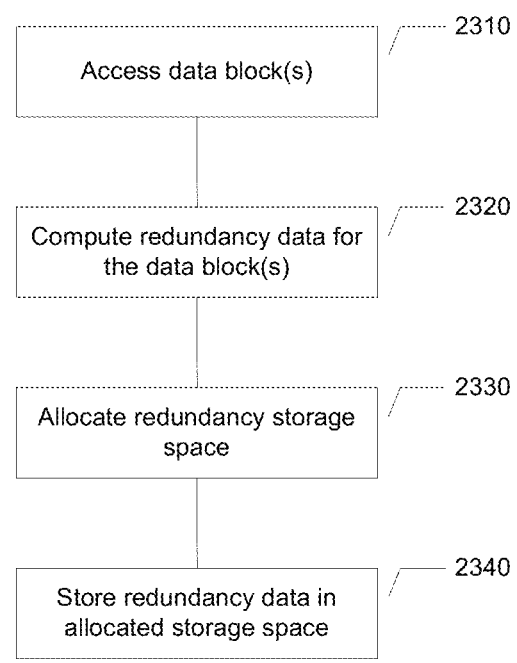
FIG. 23 is a flowchart of a process to calculate and store redundancy data, according to some embodiments.

FIG. 23 is a flowchart of a process to calculate and store redundancy data, according to some embodiments. In this example, one or more data blocks may be accessed at 2310.

In some embodiments, a data block may include a backup image. In some embodiments, a data block may include a stripe of a backup image, such as a backup image that has been compressed and/or encrypted. A stripe refers herein to a partial data image, for example of predetermined size. In some embodiments, in which more than one data block is accessed, the data blocks may correspond to substantially the same portions (e.g. relative position and size) of respective data images. In some embodiments, some or all shared data elements may be excluded from backup images, for example replaced by a reference to another instance of the shared data element. Redundancy data may be computed for the data blocks at 2320. An example of redundancy data is a replicated copy. Another example of redundancy data is an erasure correcting code for the data block(s). Storage space for the redundancy data may optionally be allocated at 2330. In some embodiments, pre-allocated storage space may be used. Redundancy data may be stored in the allocated storage space at 2340.

Figure 24:
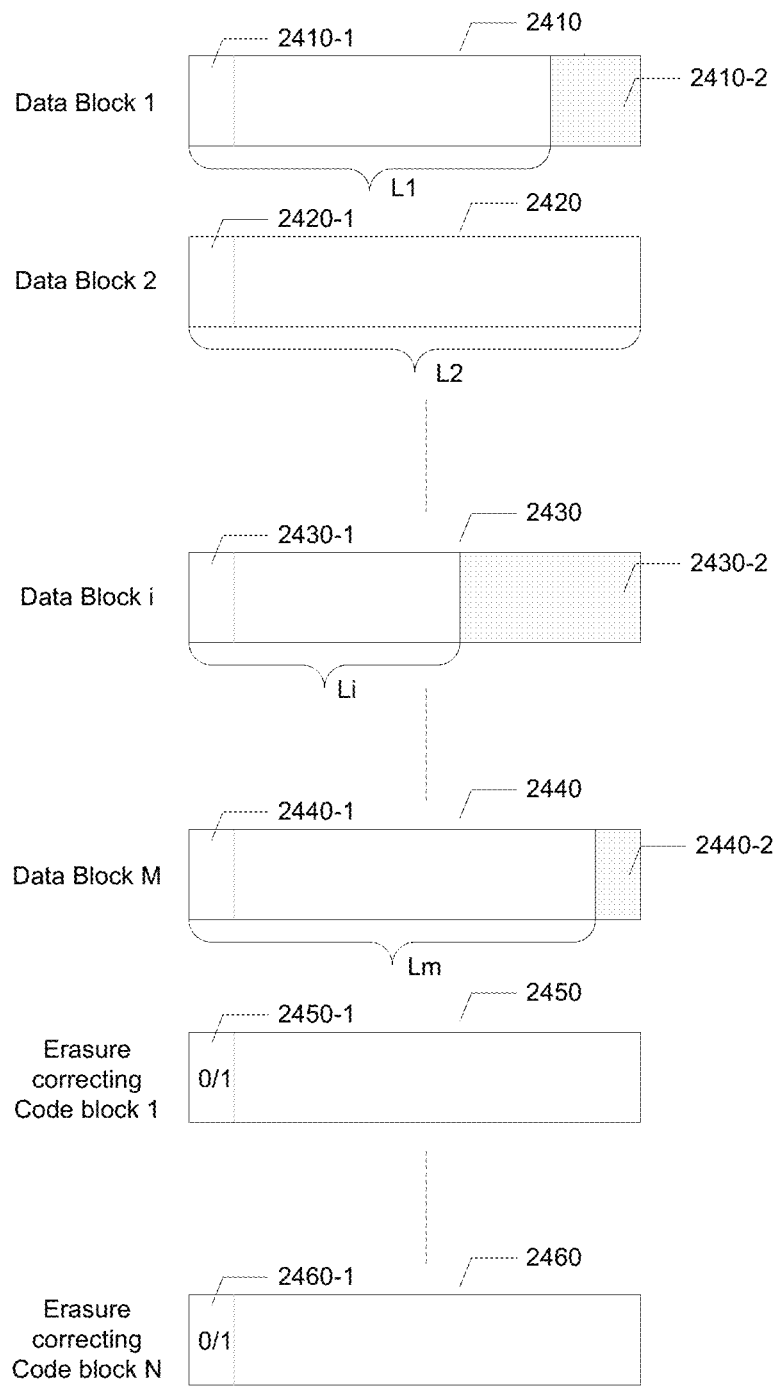
FIG. 24 depicts a scheme of generating redundancy data, according to some embodiments.

FIG. 24 depicts a scheme of generating redundancy data, according to some embodiments. In this example, redundancy data is generated in a form of one or more erasure correcting code blocks. In some embodiments, one or more backup images from a backup group may be replicated, optionally along with erasure correcting codes. In some embodiments, a data block may not be replicated and erasure correcting codes may be generated from such a data block to create one or more redundancy data blocks for a backup group. In FIG. 24, there are M examples of data blocks, 2410, . . . , 2440, from which N erasure correcting code blocks, 2450, . . . , 2460, are generated. In some embodiments, the M data blocks may be created respectively from backup images for M storage devices in a backup group.

In this example, the M data blocks are used to construct erasure correcting code blocks 2450, . . . , 2460. Each bit in this erasure correcting code block may be derived based on the values of corresponding bits from the M data blocks. An example of constructing an erasure correcting code block is to bitwise exclusive-OR each data block together to construct a single parity data block. Another example of constructing an erasure correcting code block is to generate a Reed-Solomon code block. In some embodiments, when data blocks are not the same length, shorter data blocks may be padded according to a specific length for constructing erasure correcting code blocks. For instance, the specific length may correspond on a maximum length detected from the M data blocks. In this example, the maximum length is L2 bytes, corresponding to the length of data block 2 2420. Other data blocks may then be padded up to the length of L2. In this illustration, data block 1 2410 is of length L1 and is padded L2−L1 bytes in shaded area 2410-2. Similarly, data block i is padded at 2430-2 with L2−Li bytes and data block M is padded at 2440-2 with L2−Lm bytes. The erasure correcting code blocks may then be generated based on those padded data blocks.

Padding may be performed on the fly using some value(s). For example, the value zero or the value one or any other value may be used to pad data on the fly. In some embodiments, a value used to pad data may be consistent across all data blocks. In other embodiments, values used to pad different data blocks may vary. In some embodiments, the padding data may be selected as a function of the data in the undersized block that is to be padded. For example, padding of value one may be used for all blocks in which the first bit of the undersized block has a value one, and padding of value zero may be used for all other undersized blocks. In some embodiments, padding may alternately be accomplished by using padding data instead of actually generating padded data. For example, a storage device having data to be used in generating erasure codes may report a length of its data block to a device, which may reside externally, that computes erasure codes. In constructing the erasure codes involving the data block from the reporting storage device, the device that calculates the erasure codes may use padding data rather than actual data from the reporting storage device after the reported length.

In some embodiments, each of the M data blocks may correspond to monolithic data blocks of storage devices in a backup group, such as a backup image for the storage device. In other embodiments, each of the data blocks may correspond to one or more stripes of data from backup images for storage devices. Stripes may be created to break data into smaller pieces. The number of stripes created from data associated with a storage device may be determined based on different considerations. For example, if stripes are created in p-byte blocks and the largest storage requirement from among the storage devices in the backup group is q bytes long, then there may be s=q divided by p, rounded up to the next highest integer, stripes for each monolithic data block. Erasure correcting codes can then be applied on a block basis across the s stripes of the storage devices in the backup group, each of which cuts across M p-byte sections of the backup group's constituent data blocks. For example, stripe j (with j=0 being the first stripe) could include bytes jp through (j+1)p−1 (with byte 0 being the first byte) of each of the M storage devices in the backup group. Calculation of redundancy codes can be performed independently for each such stripe as described above.

In some embodiments, the backup image for a storage device may be encrypted. Encrypted backup images may be used in creating erasure correcting codes. For example, each storage device may encrypt its backup image (for example, with DES, AES, RC5 or Blowfish, using a key, such as a key provided by a user, a key assigned by a service provider or a key generated by software, for example based on a pre-configuration or hardware configuration) before erasure correcting codes are computed. During restoration, such encrypted data may be decrypted from an obtained encrypted backup image (e.g., if a symmetric encryption technique was used, by using the same key used to encrypt the data).

Redundancy data may be generated in different operational modes. In some embodiments, redundancy data may be computed by one or more servers. This may be suitable for certain types of redundancy data. For example, some erasure correcting codes may be generated in a server operating in a centralized mode. In the case of parity redundancy data, a server may obtain data blocks from each storage device in the backup group, and exclusive-OR them together to generate parity code. In some embodiments, a redundancy code such as a parity code may be generated piecewise, for example by obtaining data blocks one at a time. In such centralized mode, a server may be a member of a redundancy group associated with an underlying backup group for which redundancy data is being generated. In some embodiments, a server may be associated with a backup service provider. A server may also form a computer pool analogous to the redundancy storage pool. In this example, when data is partitioned into multiple stripes, multiple servers may calculate redundancy data, for example using serial and/or in parallel computations.

Figure 25:
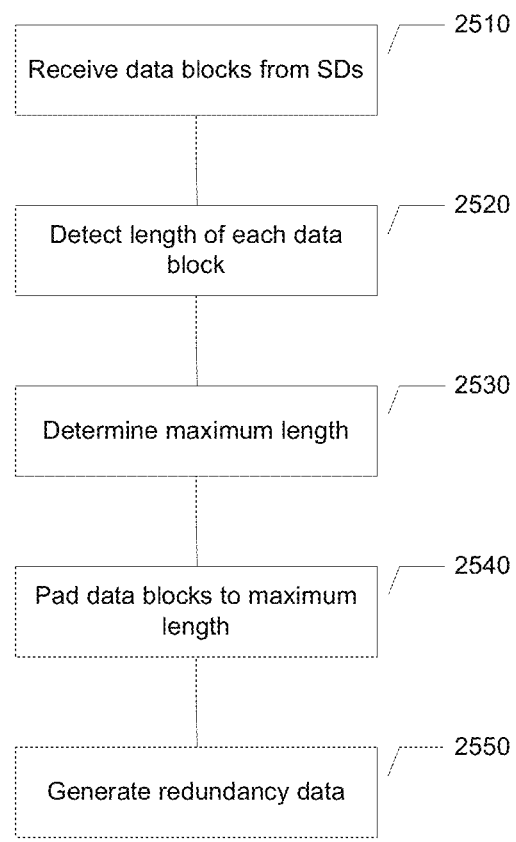
FIG. 25 is a flowchart of a process of centralized redundancy data generation, according to some embodiments.

FIG. 25 is a flowchart of a process of centralized redundancy data generation, according to some embodiments. In this example, data blocks for which redundancy data is to be created are received at 2510. Length for each received data blocks is detected at 2520. Detecting a length of a data block may be achieved by assuming a fixed length, receiving a length measure, or calculated based on a received data block. A maximum length is then determined, at 2530, based on the lengths of the received data blocks. Data blocks that have a length shorter than the maximum length are then padded at 2540, for example by padding with zeros. Using padded data blocks, redundancy data is generated at 2550.

Figure 26:
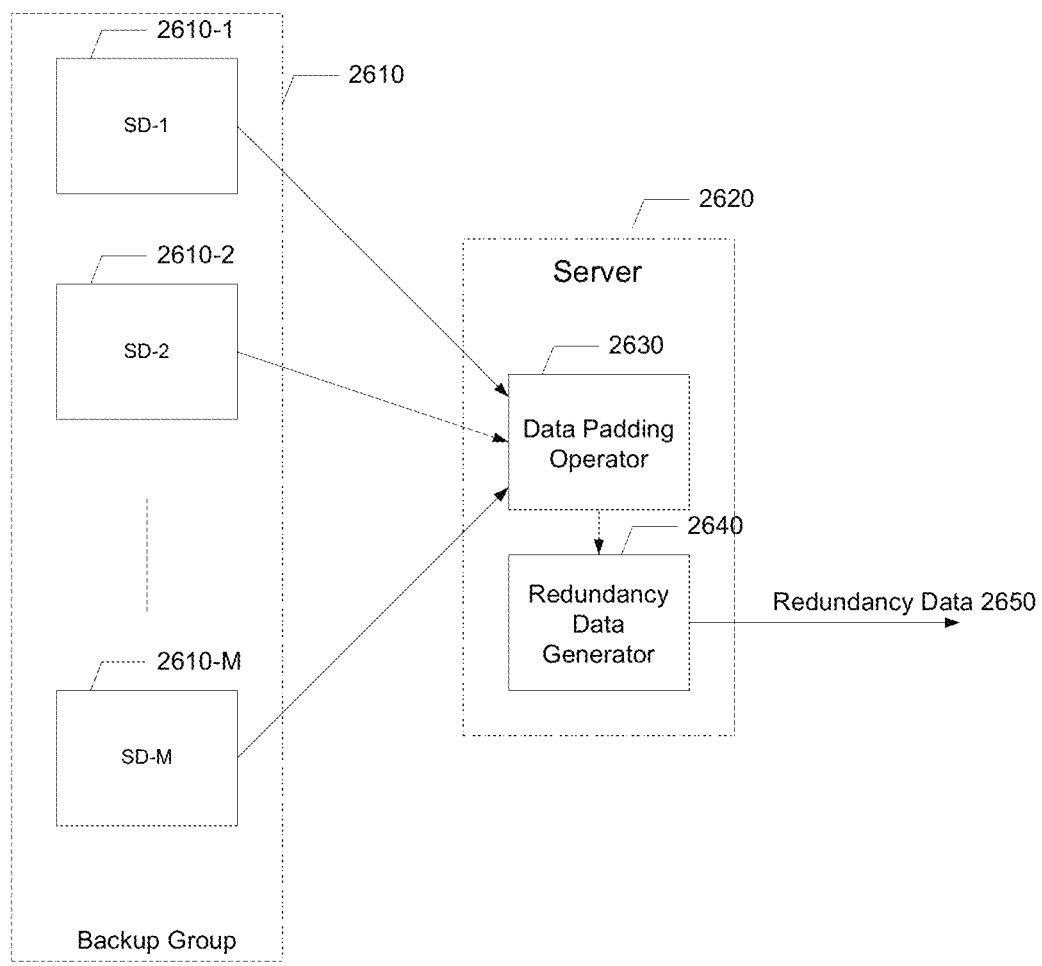
FIG. 26 depicts a construct for centralized redundancy data generation, according to some embodiments.

FIG. 26 depicts a construct for centralized redundancy data generation, according to some embodiments. In this example, each of storage devices, 2610-, 2610-2, . . . , 2610-M, of a backup group 2610 sends its data block, which in some embodiments may include stripes thereof, to a server 2620 (more than one server may also be present) for computing redundancy data. The server 2620 may comprise a data padding operator 2630 and a redundancy data generator 2640. The data padding operator 2630 may be configured to pad data blocks according to different embodiments as described above. The redundancy data generator 2640 may then create redundancy data 2650 using the padded data blocks according to some redundancy generation algorithm (e.g., erasure correcting code generation algorithm).

In some embodiments, redundancy data may also be generated in a peer-to-peer operational mode. In this operational mode, redundancy data may be computed by storage devices in a backup group and/or by storage devices where redundancy data will be stored. As an example of creating parity-based redundancy data in a peer-to-peer mode, a device in a backup group whose redundancy data is to be generated may pass its data (or a stripe thereof) to a second device. The second device may then exclusive-OR the data with its own data (or a stripe thereof) and pass the result to a third device, and so on until the last device has processed the data, at which time the redundancy data may be stored, for example by transmitting it to storage device designated for storing the redundancy data.

Figure 27:
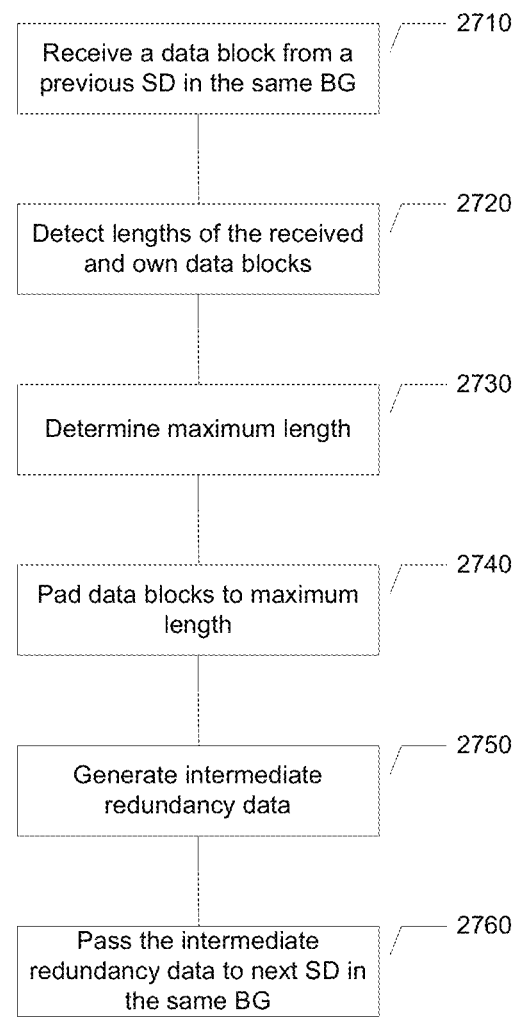
FIG. 27 is a flowchart of a process of peer-to-peer redundancy data generation, according to some embodiments.

FIG. 27 is a flowchart of a process of peer-to-peer redundancy data generation, according to some embodiments. In this example, an intermediate redundancy data block from a previous peer storage device is received at 2710. Intermediate redundancy data refers herein to data that includes a partial computation of redundancy data, for example a computation in which some but not all data to be included in the redundancy data computation has been incorporated. In some embodiments, an initial block may be used in place of intermediate redundancy data, for example a block consisting of all zeros, for the peer that initiates this process. A length associated with the received data block and a length associated with a data block of the receiving storage device are detected at 2720. Detecting a length of a data block may be achieved via different means. For example, all data blocks may be assumed to have a fixed length. A length associated with each data block may be received from a storage device sending the data block. A length associated with each block may also be computed based on a received data block. Such detected lengths may then be used to determine, at 2730, a maximum length. Such maximum length may be determined in different ways. For example, with parity data, a maximum length may be obtained through extrapolating padding. As another example, when Reed-Solomon code is used, a maximum length may be determined through a fixed length. It may also be determined, for example, via a two-pass mechanism, in which a maximum length is determined in the first pass and codes are calculated in the second pass. A data block that is shorter than the maximum length may be padded at 2740. The two data blocks are then used to generate an intermediate redundancy data, at 2750, for example by exclusive-ORing the data together. The result of the intermediate redundancy data generation may be passed on, at 2760, to a next storage device in the backup group along a peer-to-peer chain. In some embodiments, the above described operations may be performed by all storage devices in a backup group, with the possible exception of the first storage device, which may only process its local data block to generate intermediate redundancy data. In some embodiments, the above described operations are performed by all but one storage devices in a backup group, wherein the excluded device begins the process by sending a data block directly to a next peer storage device, without computation.

Figure 28:
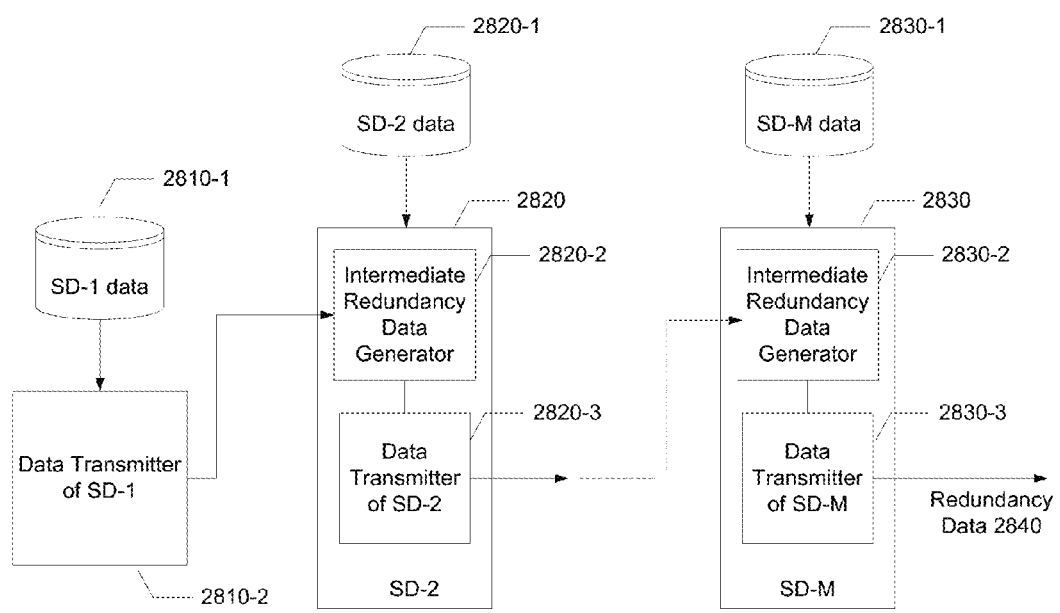
FIG. 28 depicts a construct for peer-to-peer redundancy data generation, according to some embodiments.

FIG. 28 depicts a construct for peer-to-peer redundancy data generation, according to some embodiments. In this example, a peer-to-peer chain, 2810, 2820, . . . , 2830, is illustrated for the purpose of computing redundancy data along the chain. A storage device 1 SD-1 2810 has data SD-1 data and sends SD-1 data 2810-1 to storage device 2820 through, for example, SD-1 data transmitter 2810-2. Upon receiving data from SD-1 2810, SD-2's intermediate redundancy data generator 2820-2 operates based on the data block received from SD-1 and SD-2 data 2820-1 to generate intermediate redundancy data, for example, in a manner as described with reference to FIG. 27. The intermediate redundancy data is then passed onto a next storage device, via its data transmitter 2820-3, along the peer-to-peer chain. The process continues until the last storage device SD-M generates redundancy data 2840, via its redundancy data generator 2830-2, based on intermediate redundancy data received from previous storage device and SD-M data 2830-1.

Figure 29:
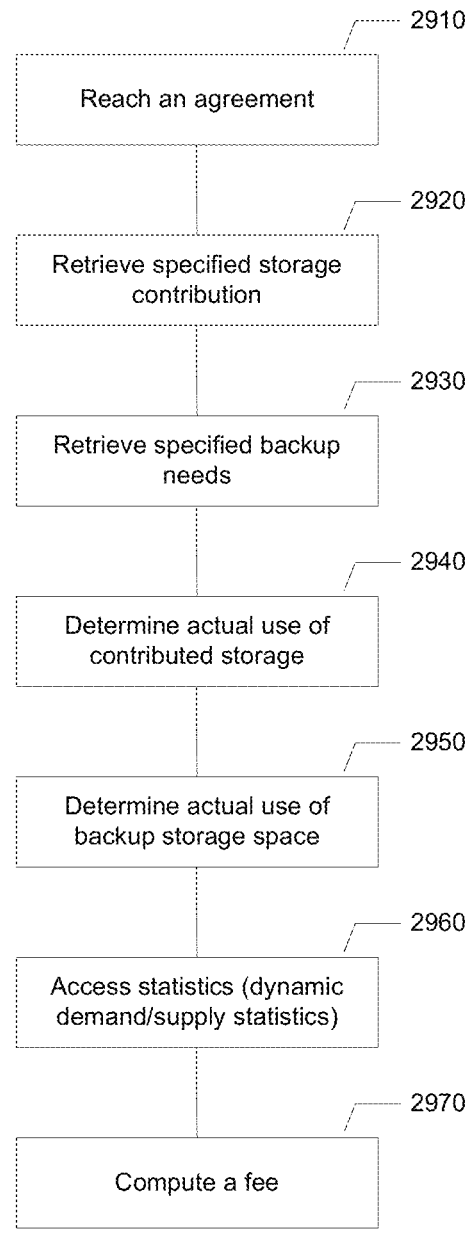
FIG. 29 is a flowchart of a process to compute a fee associated with data backup, according to some embodiments.

FIG. 29 is a flowchart of a process to compute a fee associated with data backup, according to some embodiments. A fee refers herein to any monetary calculation associated with data backup and service plan(s). In this example, a fee may be aggregated over a period of time such as one month. Examples of backup activities may include a storage device's backing up of its data on another storage device, a storage device's storing data of another storage device, a storage device's receipt of its backup data from another storage device, or a storage device's retrieving data stored for another storage device. Examples of monetary amounts associated with a service plan include a regular service fee such as a periodic (e.g. monthly) service fee, and one or more included usage level(s) associated with a regular service fee. A monetary amount associated with a storage device may be computed in considering all activities involving the storage device. For example, an activity of service-providing nature (e.g., backing up data for another device) may be rewarded a credit and an activity of service-receiving nature (e.g., backup data on another storage device) may be charged at a certain service rate. Credits and charges may be combined with respect to a storage device to derive a fee, which may also be aggregated over, for example, a fee charging period such as one month. As another example, a fee may also refer to a log recording data backup related activities. In another example, a fee may refer to some points associated with, e.g., trading for services. For example, when a storage device backs up data of others, it may accumulate points which may then be used to exchange for some services such as free download of new release movies.

A fee associated with data backup may be computed based on different considerations. In some embodiments, aspects related to consumption may be considered, including an amount of backup storage requested by a customer, an amount of storage space actually used by the customer, a grade of the storage space used, time frames the storage space is used, and/or a frequency of the usage. These aspects of considerations may play a role in determining a charge amount to a customer. In some embodiments, aspects associated with storage contributions made by a customer may also be taken into account in fee computation, including an amount of backup storage contributed by a customer, an amount of contributed storage space that is actually used by others, the grade of the contributed storage space, time frames the contributed storage is used, and/or a frequency associated with the usage. These aspects of considerations may attribute to determinations of credits given to a customer. In some embodiments, a service agreement reached between a customer and a service provider may provide information related to fee computation such as a charge rate schedule with respect to different levels of usage of certain grade of backup storage.

Fee computation may also take into account statistical information related to, for instance, demand and supply relations at the time a customer backs up data or stores backup data for others. Such information may play a role in determining a changing rate associated with data backup. For example, when demand is high and supply is low, a rate associated with data backup may increase. Such an increase may reflect in a fee charged to a storage device whose data is backed up and/or a credit rewarded to a storage device that stores data of another storage device. For example, a user may be charged by a service operating over the Internet at a certain rate (e.g., two cents per megabyte per month) for his/her backup storage needs and credited a certain amount (e.g., one cent per megabyte per month) for the backup storage contribution made or for the utilized portion thereof. Such a credit can be limited or dynamically priced based on overall redundancy storage needs. For example, if redundancy storage needs are more than 90% of the total redundancy storage pool size, the amount credited for each contribution may be increased. If redundancy storage needs are less than 90% of the total redundancy pool size, the amount credited for each contribution may be reduced or eliminated.

In the illustrative operation shown in FIG. 29, an agreement as to data backup may be reached at 2910. For example, an agreement may include one or more agreement between two storage devices, between a backup group and a service provider, between a storage device and a service provider, and/or among a collection of members of a storage group. In some embodiments, a service provider may also be a service broker or an agent representing a service provider. An agreement may provide information such as a fee schedule with respect to various quota associated with data backups. In operation, a device that computes a fee may retrieve relevant information before a fee is computed. Such information may include both static and dynamic information. For instance, a contribution made by a user for whom the fee is being computed may be retrieved at 2920. Backup needs specified by the customer when, for example, a service agreement is reached may also be retrieved at 2930. Information related to actual storage space consumption and actual contribution may be determined at 2940 and 2950, respectively. Dynamic statistics may also be accessed at 2960. Based on information obtained, a fee is computed at 2970. Such a fee may be computed by reconciling actual service charges associated with backup storage usage and credits associated with providing backup storages. Such computation may be accumulated over a period of time such as a service charging period of one month. All credits and all debits accumulated within such a period may be aggregated to derive an overall charge (or credit) for the period.

In some embodiments, a storage device may be removed from a backup group under certain situations. For example, a storage device that is not available may be removed from a backup group. A storage device may be detected or anticipated to become unavailable in a future time frame. For example, a user may be planning extended travel with his notebook computer at a location where participating in a backup group to which it belongs may become difficult due to, for instance, intermittent connectivity or low bandwidth. In such situations, the notebook computer may be practically considered as unavailable. When this occurs, the notebook computer is removed from its backup group in this example. As part of the removal operation, a copy of the data on the notebook computer may be archived in a backup storage independent of the backup groups. This may effectively create a degenerate singleton backup group. The removed notebook computer may also be grouped as a member of a different backup group, for example one with low availability.

Figure 30:
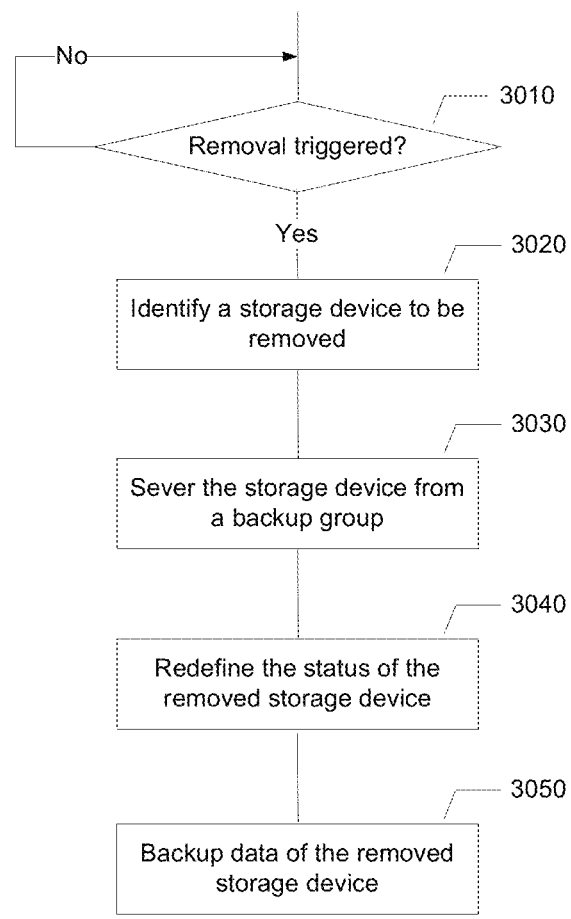
FIG. 30 is a flowchart of a process to remove a storage device from a backup group, according to some embodiments.

FIG. 30 is a flowchart of a process to remove a storage device from a backup group, according to some embodiments. In this example, a decision to remove a storage device from a backup group is triggered at 3010. As discussed above, removal may be triggered in different situations such as unavailability, including detected unavailability or anticipated unavailability. When removal is triggered, a storage device to be removed is identified at 3020 and severed from a backup group to which it belongs at 3030. In some embodiments, a storage device may be removed from a backup group after re-computing redundancy data for the remainder of the group. In some embodiments, re-computing redundancy data may include using one or more previously generated snapshots. In some embodiments, re-computing redundancy data may include taking one or more new snapshots. In some embodiments a storage device may be removed from a storage group, but may continue to assist in backup operations requiring the provision of a backup image. In some embodiments, a storage device may be removed from a backup group by relocating replicated data contained on the severed device, and/or removing replicated data associated with the severed device. Details related to re-generating redundancy data during removal are discussed with reference to FIGS. 31 and 32. Once a storage device is removed from a backup group, its status as to backup operations may be redefined at 3040. For example, as discussed above, it may be regrouped with another backup group (e.g., with member storage devices having similar properties) or treated as a degenerate singleton backup group. Based on such redefined status, data of the removed storage device may be backed up at 3050.

Removal of a storage device from a backup group may affect data backup of other member storage devices of the backup group. For example, as discussed in conjunction with FIGS. 23-28, redundancy data of a backup group may be generated based on data blocks from member storage devices. Therefore, redundancy data for a backup group with its member storage device(s) removed may be updated with respect to remaining member storage devices. In some embodiments, such an update to the redundancy data may be effectuated by recalculating redundancy data based on data blocks from remaining member storage devices.

Figure 31:
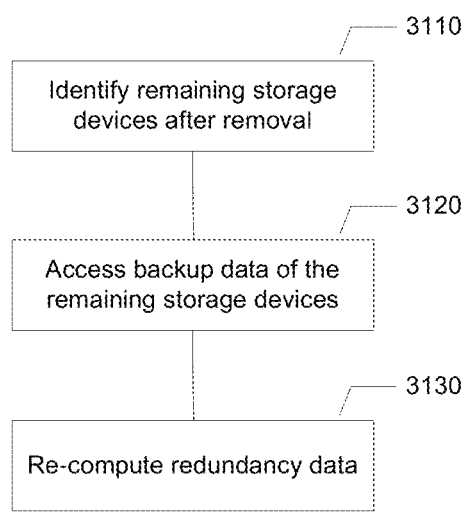
FIG. 31 is a flowchart of a process to compute redundancy data during removal of one or more members of a backup group, according to some embodiments.

FIG. 31 is a flowchart of a process to compute redundancy data during removal of one or more members of a backup group, according to some embodiments. In this example, remaining member storage devices in a backup group are identified at 3110. Data blocks from such identified remaining member storage devices are accessed at 3120. In some embodiments, a data block may be a backup image. In some embodiments, a data block may be a stripe of a backup image. In some embodiments, data blocks from remaining member storage devices may be stored at a device designated to compute redundancy data. For example, a server may have stored a copy of all data blocks received from all member storage devices, including a storage device that has been removed. In this case, the server may retrieve data blocks for remaining member storage devices. In some embodiments, data blocks from remaining member storage devices may be resent to the device designated to compute redundancy data. Redundancy data for remaining member storage devices may then be computed, at 3130. Redundancy data may be generated by various means, for example, including those described in conjunction with FIGS. 23-28.

In some embodiments, redundancy data for a backup group with member storage device(s) removed may be computed using different means. For example, redundancy data may be recalculated by extracting data of a removed storage device from original redundancy data computed for the backup group before removing the device. For example, when a parity erasure correcting scheme is used in computing the original redundancy data, updated redundancy data with a single storage device removed may be derived by exclusive-ORing the data from the removed storage device with that contained in the original redundancy data block(s).

Figure 32:
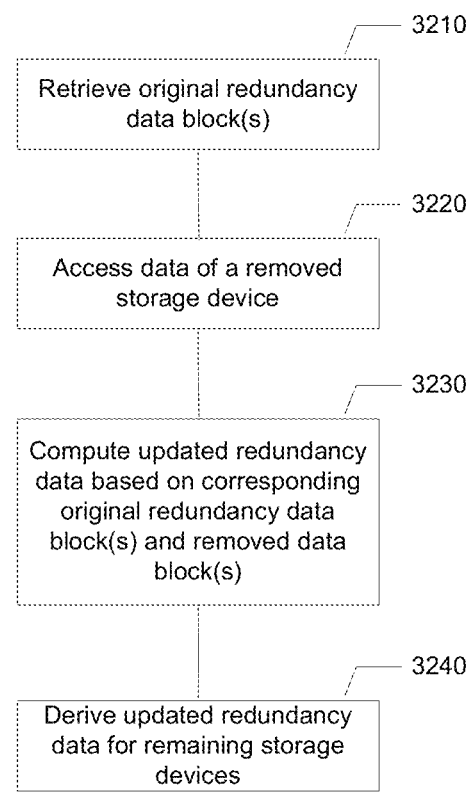
FIG. 32 is a flowchart of a process to compute updated redundancy data during removal, according to some embodiments.

FIG. 32 is a flowchart of a process to compute updated redundancy data during removal, according to some embodiments. In this example, original redundancy data computed prior to removal of storage device(s) may be retrieved at 3210. Data of removed storage device(s) may be accessed at 3220. Corresponding elements of the original redundancy data block(s) and the removed data block may be used to compute, at 3230, an element of the updated redundancy data, which is then derived, at 3240. For example, when a parity code is used as an error correcting code, an exclusive-OR operation may be performed between one or more original redundancy data blocks and a removed data block to yield updated redundancy data block(s).

In some embodiments, a storage device may signal a need to reconstruct its data from the data stored on a set of backup storage devices, which may include members of its backup group and associated redundancy group. Data reconstruction may be performed directly by the storage device or through an intermediary such as a peer, a server, or a directory service that may locate peers in an appropriate backup group. In some embodiments, to reconstruct data, a sufficient number of backup storage devices may be identified and gathered, from which data are retrieved and used for reconstruction. For example, if there are six storage devices in a backup group and three storage devices that are associated with a redundancy group using Reed-Solomon coding, then reconstruction may be achieved when any six of these nine potential backup storage provider devices are available. When fewer than a required number of backup storage devices are available, restoration may be accomplished in various ways, depending on, for example, specific configurations.

In some embodiments, when fewer than a required number of backup storage devices are available, restoration may be postponed until a time when a sufficient number of backup storage devices are available. For example, restoration may be carried out when a sufficient amount of data can be retrieved from an adequate number of available storage devices. In other embodiments, a partial restoration may be performed even when fewer than a required number of storage devices are available. For example, in such an operational mode, data retrieved from currently available storage devices may be used to generate partially restored data. When more storage devices become available at a future time, the partially restored data may then be used together with data retrieved from storage device(s) that becomes available at that future time to progressively restore data. For example, data restoration in this operational mode may be achieved gradually over time until the aggregated restoration is based on backup data from an adequate number of backup storage devices.

Figure 33:
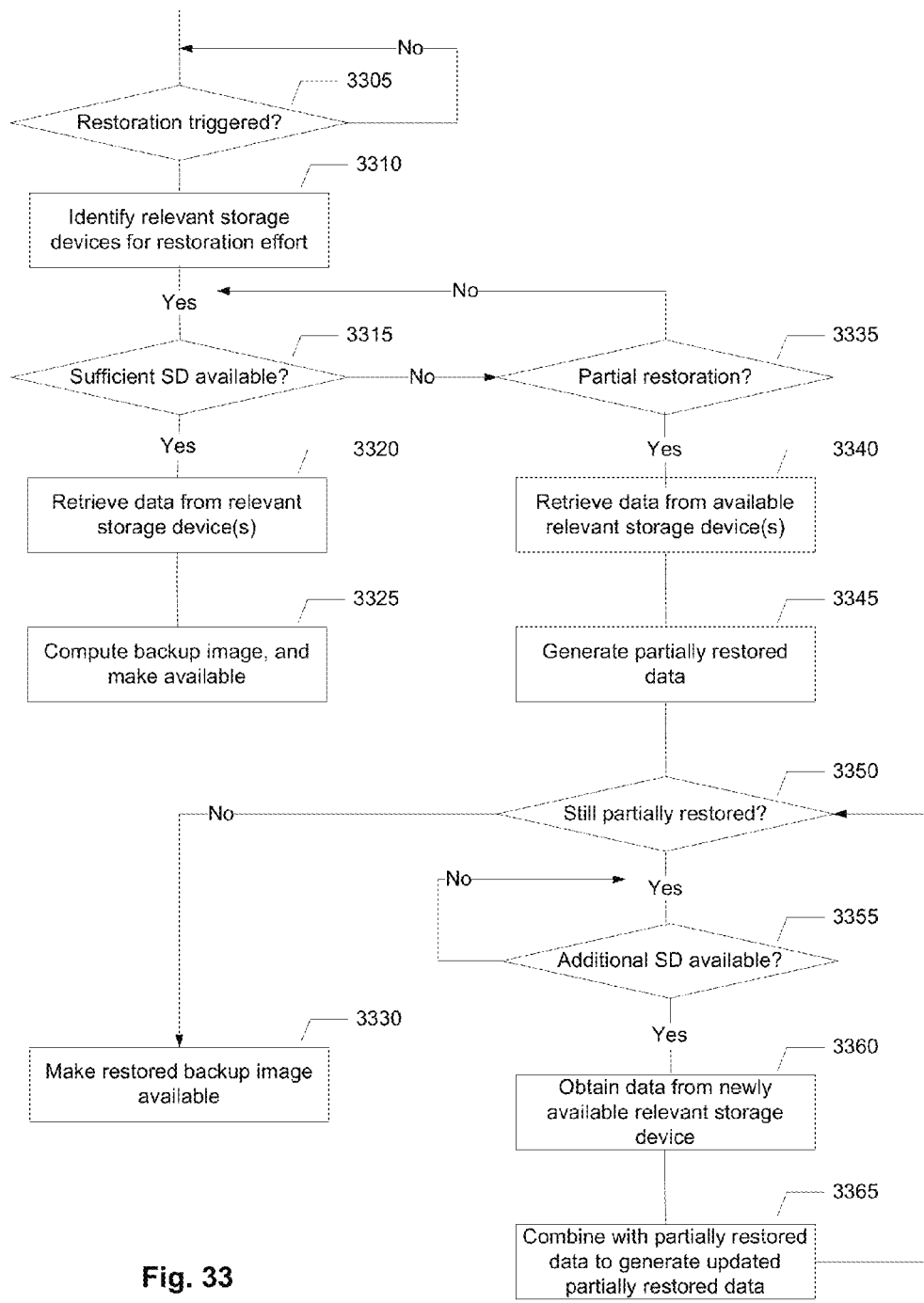
FIG. 33 is a flowchart of a process to restore a backup image for a storage device, according to some embodiments.

FIG. 33 is a flowchart of a process to restore a backup image for a storage device, according to some embodiments. In this example, a decision as to whether data restoration is triggered is first made at 3305. Different criteria may be implemented as a triggering condition for data restoration. For example, a user or an administrator may activate data restoration. As another example, upon a system reboot from an emergency power shutdown, data restoration may be automatically triggered. As another example, when data loss is detected, data restoration may be triggered. Relevant storage devices are identified at 3310. Relevant storage devices are storage devices that posses or can make available relevant data. Relevant data may include redundancy data and backup images, if any, that were used to compute the redundancy data. It may be determined, at 3315, whether sufficient relevant backup storage devices are available. If a sufficient number of relevant storage devices are available, restoration may continue at 3320, in this example. Redundancy data may be retrieved, at 3320, from such identified storage devices. In some embodiments (not shown), backup devices may retain a snapshot of the backup image that was supplied during the computation of the redundancy data. Snapshotted backup images may be retrieved at 3320 from relevant storage devices. The combined images and/or redundancy data may be used to compute a desired backup image, for example using an erasure correcting code, and it may be restored or made accessible, at 3325

When fewer than a sufficient number of backup storage devices are available, determined at 3315, it may be further determined in this example, at 3335, whether restoration is to be achieved through a partial data restoration process. Such a determination may, for example, be made by a user or according to a policy. If no partial data restoration is to be performed, the process may return to 3315 in this example until a sufficient number of storage devices become available. To achieve restoration via partial restoration, data from currently available relevant storage devices may be retrieved at 3340. Computation based on retrieved data may be carried out at 3345 to generate partially restored data. In some embodiments, during partial restoration, relevant data from one or more backup storage devices may be replicated to one or more appropriate locations such as to storage device(s) that have a higher availability (e.g., a dedicated server, a device with a high-availability contract, or a storage device that has historically maintained relatively high availability). In some embodiments, redundancy data may be replicated. In some embodiments, a compressed form of the redundancy data may be replicated. As an example of processing at 3340, when parity codes are used, retrieved data from currently available relevant storage devices may be exclusive-ORed together and the result of such operation may be used as the partially restored data rather than the retrieved data. In some embodiments, retrieved data may be replicated in a single highly available location. In some embodiments, retrieved data may be replicated in more than one location.

When restored data remains partial, as determined at 3350, it is further determined, at 3355 in this example, whether there are other formerly unavailable relevant storage devices that have become available. When additional storage devices become available, relevant data from such storage device(s) is retrieved at 3360 in this example. The additional relevant data may be combined with previously partially restored data, at 3365, to generate updated partially restored data. The process may continue until it is determined, at 3350, that the restored data is no longer partial (e.g., restoration at this point is performed based on data from a sufficient number of storage devices). At that point, data restoration may be completed at 3330.

Figure 34:
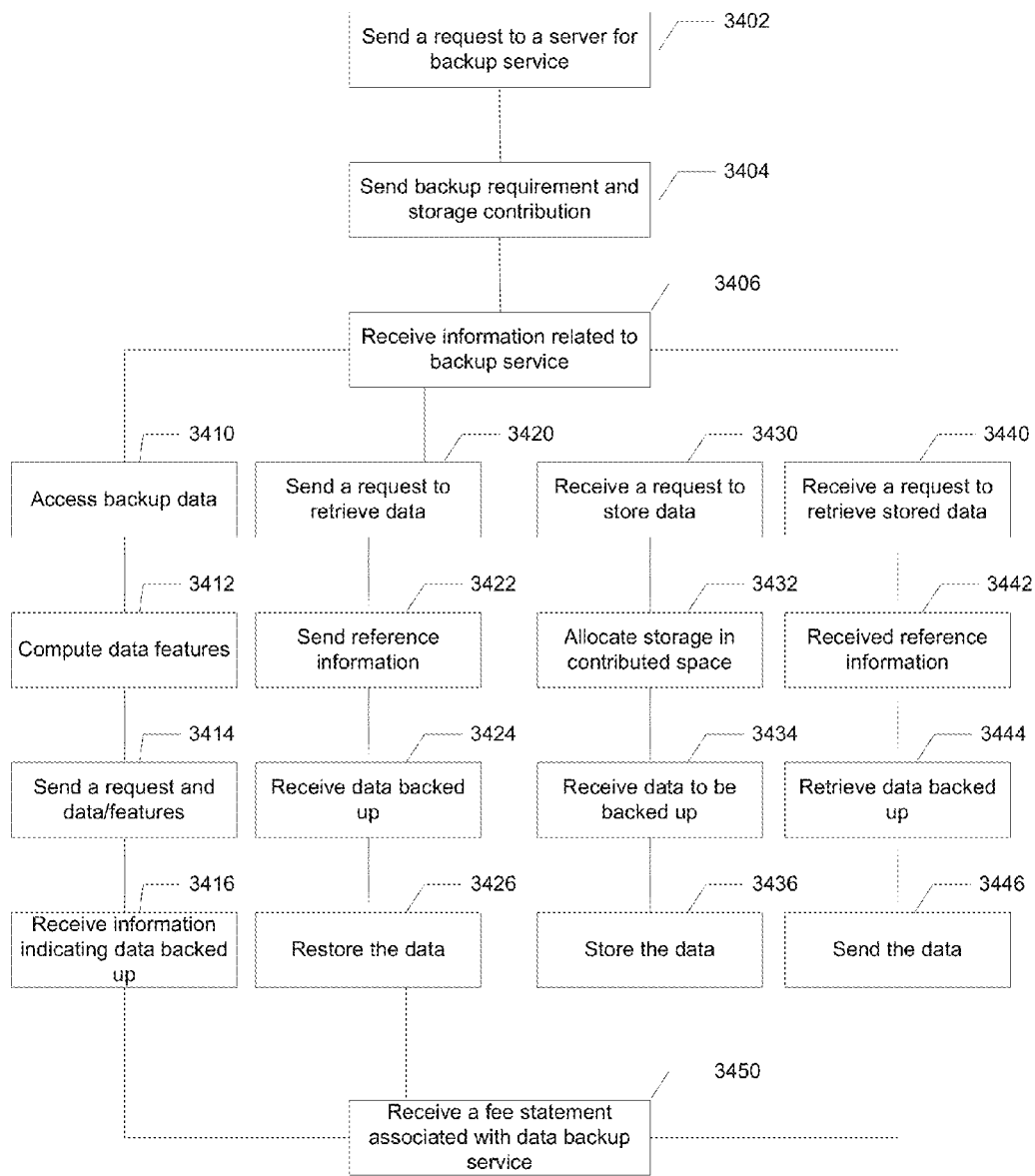
FIG. 34 is a flowchart of a process for a storage device in a server based model, according to some embodiments.

FIG. 34 is a flowchart of a process for a storage device in a server based model, according to some embodiments. In this example, a request for participating in distributed data backup is sent to a centralized party at 3402. Along with the request, information related to requirements associated with desired backup service and/or storage contributed for backing up data for others may also be sent, at 3404, to the server. Upon approval of the service request, information associated with the service may be received at 3406. Such information may include a service agreement, a backup group to which the requesting storage device belongs, or redundancy group(s) associated with the backup group, etc.

To operate in a centralized mode, a storage device participating in distributed backup may perform various functions with the assistance of a centralized party. This may include backing up its data, retrieving its backup data from backup locations for restoration, storing backup data from other storage devices (including member storage devices from the same backup group or storage devices outside of the backup group), and/or making backup data stored for other devices available when needed.

To backup its data, a storage device may first access data to be backed up at 3410. Features of the data may be computed at 3412. Such features may include checksums or redundancy data. A request to perform a backup operation, along with data to be backed up and/or features thereof, may be sent, at 3414, to a centralized party. In some embodiments, information related to where to store data may be received from the centralized party that directs a requesting storage device to a storage device whose storage space is allocated to store data of the requesting device. Based on such information, a requesting storage device may then send data to be stored in the allocated storage space to the storage device. In some embodiments, such allocated space may be pre-committed at the time when, for example, the underlying backup group is formed. In some embodiments, such storage space may be dynamically allocated when a request is received. When data is stored, the requesting storage device may receive, at 3416, information indicating a status associated with the requested backup.

To restore data based on data backed up via a centralized party, a storage device may send a request at 3420. In some embodiments, the request may be sent to a centralized party. In some embodiments, the request may be sent to one or more peer storage devices in a backup group or an associated redundancy group. Along with the request, reference information associated with the data to be retrieved may also be sent at 3422. When the requested data is received, at 3424, data may be restored, at 3426, based on the retrieved data. Examples of retrieved data include replicated data, reconstructed generated redundancy data such as data reconstructed from erasure correcting code blocks, and generated redundancy data such as erasure correcting code blocks.

To store backup data from other storage devices in contributed storage space, a storage device may receive a request at 3430. Such a request may also include information related to the data to be backed up such as the amount of space needed or a desired degree of availability for the backup data. Based on received information, storage in the contributed space may be allocated at 3432. When data to be backed up is received, at 3434, it may be stored in the allocated storage space at 3446.

To retrieve data backed up for other storage devices, a storage device may receive, at 3440, a request for retrieving data. In some embodiments, a request may be received from a centralized location. In some embodiments, the request may be received from a peer storage device. Reference information specifying data to be retrieved may also be received at 3442. Based on the received information, data that has been backed up on the storage device previously is retrieved at 3444 and may be made available at 3446. A storage device participating in distributed backup operations under a server based model may also receive, at 3450, a fee charged associated with the backup related services.

Figure 35:
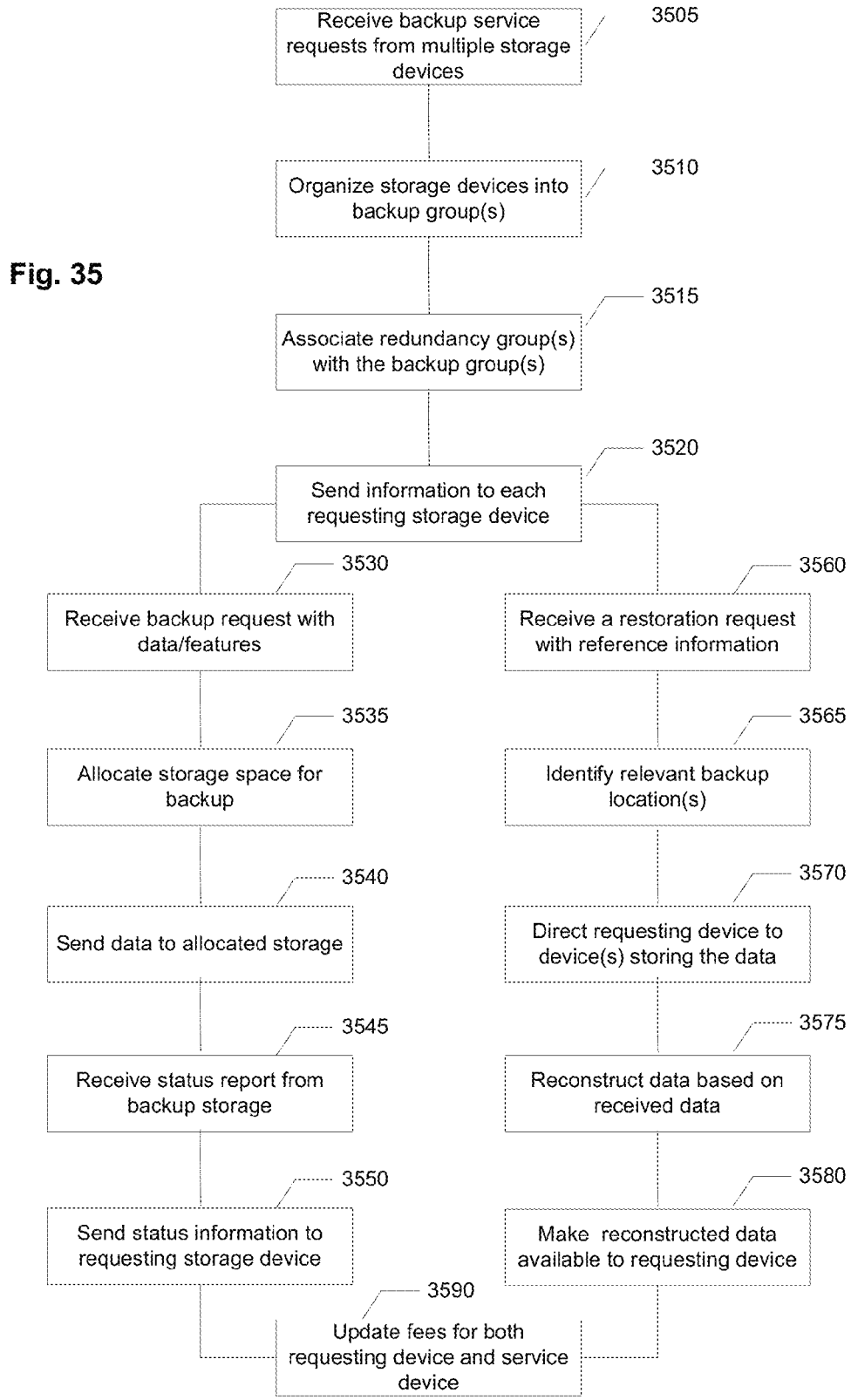
FIG. 35 is a flowchart of a process for handling requests at a centralized party, according to some embodiments.

FIG. 35 is a flowchart of a process for handling requests at a centralized party, according to some embodiments. In this example, requests from multiple storage devices for distributed backup services are received at 3505. Other types of information specifying desired services may also be sent along with the requests. For instance, requirements associated with each service request and/or parameters related to storage space contributed by the requesting storage devices may also be received. According to such information, the requesting storage devices may be organized into one or more backup groups and/or redundancy groups, etc. To facilitate backup operations, some backup groups may be associated with one or more redundancy groups at 3515. In some embodiments, a backup group may be associated with exactly one redundancy group. Information related to a status with respect to some or all received requests may then be sent, at 3520, to some or all of the requesting storage devices. Such information may include a service agreement, a backup group to which the requesting storage device belongs, redundancy group(s) associated with the backup group, one or more redundancy groups to which the storage device belongs, etc.

In operation, to facilitate centralized distributed data backup, a request for backing up data is received, at 3530, from a storage device in a backup group. Data to be backed up or features thereof (e.g., checksums or other hashes) may also be received along with the request. Storage space needed for the requested backup may be allocated at 3535. In some embodiments (not shown), storage space may be reserved, but not allocated, and actual allocation may be made before using the storage. In some embodiments, previously allocated storage may be selected. Such storage space may be identified from other member storage devices in the same backup group, from storage devices from another backup group, from storage devices in a redundancy group, or from other storage devices such as dedicated storage devices. Data to be backed up may then be sent, at 3540, to the storage device where the backup space is allocated. When information indicating a backup status is received, at 3545, from a storage device that backed up data, such status information may be sent, at 3550, to the requesting storage device. In some embodiments, a fee associated with the requesting storage service and a fee associated with each storage device on which requested backup is effectuated may be updated at 3590. The former may be updated with a charge and the latter may be updated with a credit.

After data is backed up, centralized restoration may also be facilitated. In this example, a restoration request is received at 3560. Reference information identifying the data to be restored may also be received along with the restoration request. Based on the reference information, one or more relevant storage devices where relevant redundancy data is stored may be identified at 3565. Based on the reference information, the requesting device may be directed, at 3570, to the identified storage device(s) to retrieve relevant data. In some embodiments (not shown), the centralized party may serve as an intermediary that requests data to be retrieved from the identified storage device(s), or it may direct a third party to retrieve the relevant data. The centralized party may optionally serve as a party that reconstructs, at 3575, data for a requesting device. In some embodiments, the centralized party may direct the reconstruction, for example by defining the computation needed to compute the restoration from the relevant data. Reconstruction may be based on generated redundancy data and related backup images, or based on replication, or based on compressed replication, or based on encrypted replication, or some combination, etc. Reconstructed data may then be made available at 3575, to the requesting device, for example by sending it to the requested device. A fee associated with the requesting party (which may be a charge) and a fee associated with each of the retrieving storage device (which may be a credit) may be updated at 3590. The amount of each fee for retrieving backup data may be different from that for backing up the data.

Figure 36:
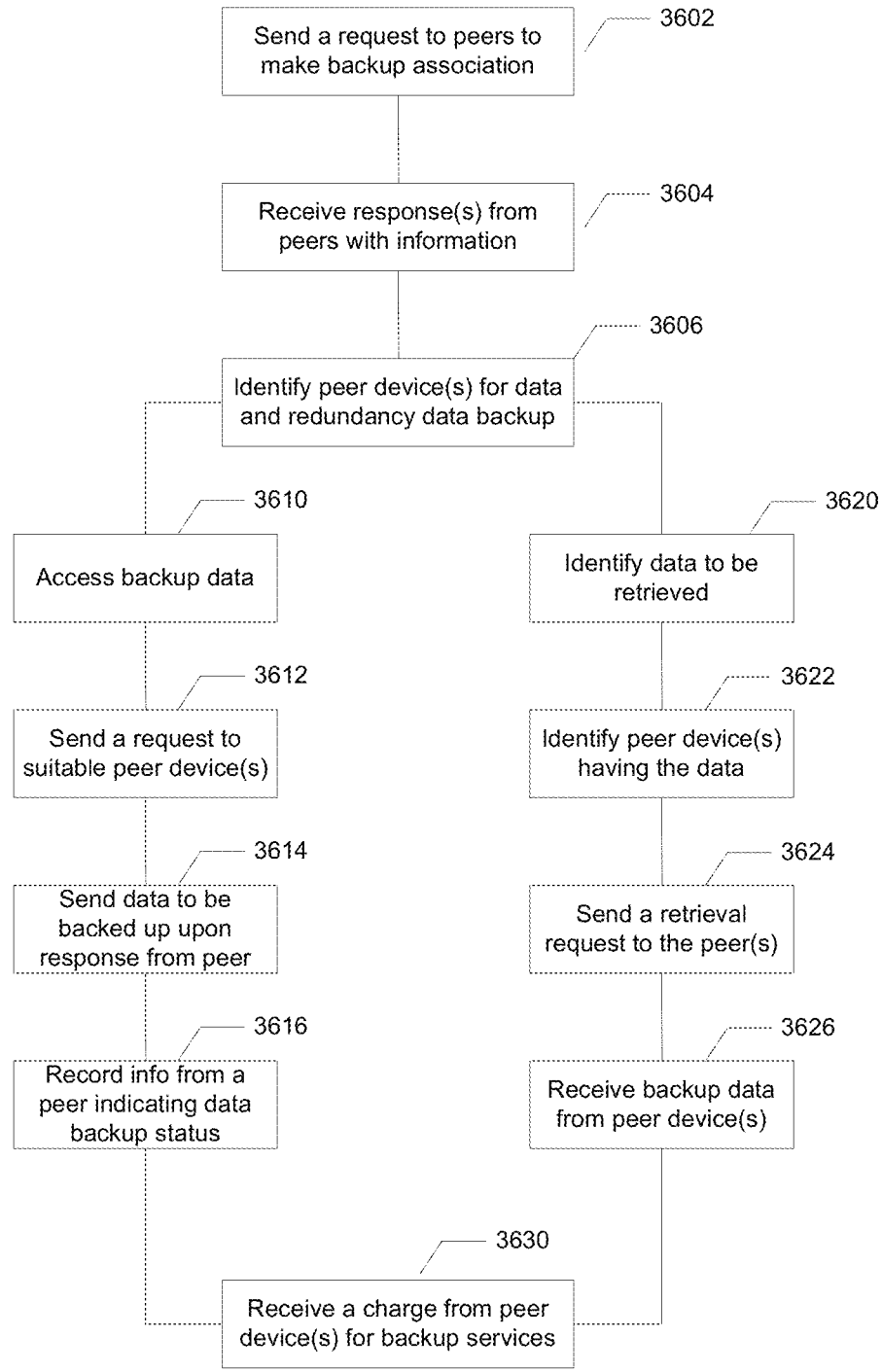
FIG. 36 is a flowchart of a process for a backup service operating under a peer-to-peer model, according to some embodiments.

FIG. 36 is a flowchart of a process for a backup service operating under a peer-to-peer model, according to some embodiments. In this example, in a peer-to-peer operational mode, a storage device sends, at 3602, a request to peer device(s) requesting to associate with peers for data backup purposes. In some embodiments, such a request may be sent as a broadcast in a local region and any responding device may be considered as a peer device. In some embodiments, a requesting device may send a request to one or more pre-configured peer devices, for example a peer device designated as a backup manager. For example, in a household with five storage devices, each of the storage devices may be configured to have four peer devices. Such pre-configured peer devices may be prioritized and a requesting device may send a request to a peer device with a highest priority. A requesting device may also send a request to all peer devices. The request may include information such as requirements associated with backup needs and/or storage that can be contributed for backing up data for peer devices. One or more responses from peer storage devices may be received at 3604. A response from a storage device to a request may contain information describing, for example, the storage space available for backup purposes on the responding storage device and optionally a commitment that may have been made with other peer storage devices with respect to such storage space. Such a response may also include information as to availability or a charge rate associated with data backup. Based on such information received from responding device(s), a requesting storage device may identify, at 3606, some responding storage device(s) as suitable backup partner(s). Such identification may be made by, for instance, matching its own needs with what is available. For example, some peer storage devices may provide storage space of high availability and some may offer storage space at a lower rate.

To operate under this peer-to-peer model, a storage device participating in distributed backup may perform various functions. This may include backing up its data on peer device(s), retrieving its backup data from peer device(s) where such data is backed up, storing backup data from other peer storage devices, or making backup data stored for other peer storage devices available when needed.

To backup its data, a storage device may first access data to be backed up at 3610. This may include computing certain features of the data such as redundancy data. A request for backing up data may be sent, at 3612, to certain peer devices determined based on its needs. As discussed earlier, peer devices may be determined in various ways. In some embodiments, peer devices may be identified via broadcasting a request. In some embodiments, peer devices may be pre-configured. Along with the request, information describing, for example, data to be backed up and requirements thereof may also be sent to the peers. In some embodiments, data to be backed up may be replicated from the requesting device to a storage device that agrees to back up the data. In some embodiments, redundancy data such as erasure correcting codes may be computed based on the data is to be stored on another storage device. Upon receiving a response from a peer device expressing its willingness to store data for the requesting storage device, data is sent, at 3614, to a responding peer device. In some embodiments, a peer device may be selected from among multiple responding peer devices, for example by selecting a peer device with relatively high availability, or relatively low cost. The requesting storage device may then record, at 3616, status information related to the request received from the peer device on which data is stored. This may include information indicating which piece of data is stored on which peer storage device(s).

To retrieve backup data in a peer-to-peer model, a storage device identifies, at 3620, data to be retrieved. Examples of data to be retrieved include data that is backed up and redundancy data computed from data such as erasure correcting codes. Peer storage device(s) that store the identified data may also be identified at 3622. A request for retrieving the data may be sent, at 3624, to the identified peer storage device(s). Along with the request, reference information associated with the data to be retrieved may also be sent. The requested data may then be received, at 3626, from the peer storage device(s). A fee associated with the requested services received from peer storage device(s) may be updated at 3630.

Figure 37:
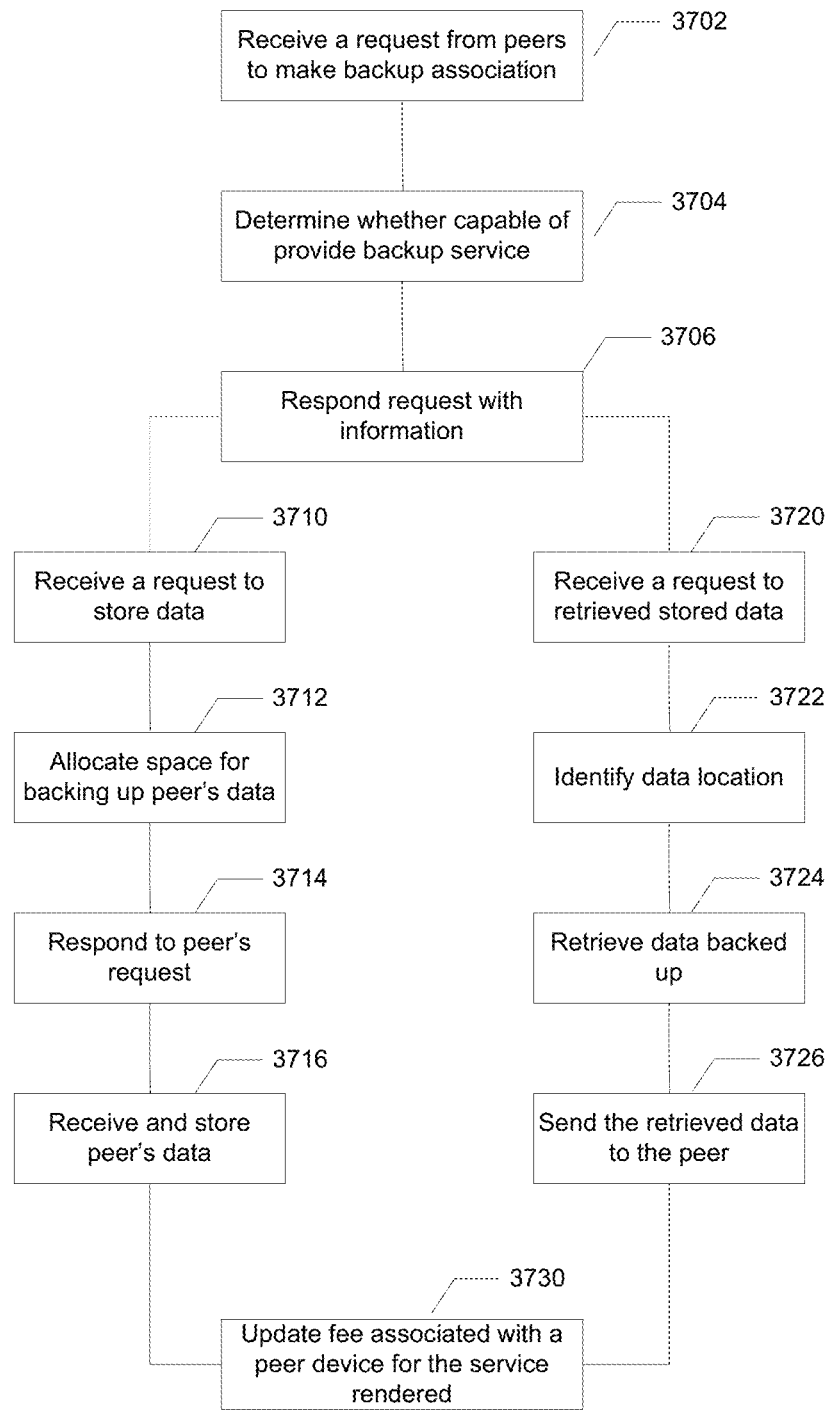
FIG. 37 is a flowchart of a process for a backup service providing storage device operating under a peer-to-peer model, according to some embodiments.

FIG. 37 is a flowchart of a process for a backup service providing storage device operating under a peer-to-peer model, according to some embodiments. In this example, a request from a peer storage device seeking association for backup services is received at 3702. Other types of information specifying desired services may also be received along with the request, such as requirements associated with desired backup needs. Based on such information, a service storage device may determine, at 3704, whether it is capable of providing the requested services. Such a determination may be made by examining whether the storage available on the service providing storage device can meet specified characteristics associated with the requested services. In addition, it may also determine whether available storage space has been committed to other peer devices or whether there is adequate amount of available space for the backup operation. If the service storage device determines that it can meet the needs of the requesting storage device, it may respond, at 3706, the received request. Such a response may include information describing the storage space on the service storage device that is intended to serve the backup needs of the requesting storage device.

In operation, to backup data for a peer storage device, a service providing storage device may receive a request from a requesting peer storage device at 3710. Such a request may include information describing the data to be stored such as the amount of space needed or a desired degree of availability of the storage for the data. Based on such received information, storage needed is allocated at 3712. Upon successful allocation of needed storage space, the service providing storage device responds, at 3714, to the requesting storage device by, for example, accepting the request to store data. Upon receiving the data to be stored from the requesting storage device, the service providing storage device stores, at 3716, the data in the allocated storage.

To retrieve data stored for a peer storage device, a service providing storage device receives, at 3720, a request from a requesting peer storage device whose data (e.g., redundancy data such as replicated data or erasure correcting codes) has been stored on the service providing storage device. To retrieve the stored data, the service providing storage device may identify, at 3722, storage location(s) where relevant data is stored. The stored data is then retrieved, at 3724, from such identified location(s) and sent, at 3726, to the requesting storage device, where processing may be performed. A fee associated with the requesting device may be updated, at 3730, based on the service rendered.

In a peer-to-peer model, a storage device may be both a service requesting storage device and a service providing storage device. In some embodiments, a storage device may perform an additional function to automatically reconcile between a charge received from a peer storage device for services provided and a credit earned for backup services rendered to the same peer storage device. In some embodiments, reconciliation may be done via mutual agreement between peer devices, which may for example include cryptographically signed proof of agreement. In addition, a storage device may maintain accounting with respect to peer storage device(s), which are affiliated with the storage device for peer-to-peer distributed backup purposes.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   creating a redundancy data element by computing an erasure correcting code on elements of data from a first set of computers selected from among a plurality of computers connected by a digital network, wherein the plurality of computers includes a first computer and a second computer, wherein the first set of computers includes the first computer and the second computer, and wherein the elements of data from the first set of computers includes a first data element from the first computer and a second data element from the second computer;
   transmitting the redundancy data element to a third computer for storage thereon;
   receiving a request for data restoration relating to the first data element;
   creating a restoration data, wherein the restoration data is a reconstruction of the first data element, wherein creating the restoration data includes computing an erasure correcting code on elements of data from a second set of computers, wherein the second set of computers includes the second computer and the third computer, and wherein the elements of data from the second set of computers includes the second data element and the redundancy data element; and
   providing the restoration data responsive to the request for data restoration.

2. The method of claim 1, wherein the elements of data from the first set of computers are stripes.

3. The method of claim 1, wherein the erasure correcting code is a parity code.

4. The method of claim 1, wherein the erasure correcting code is an algebraic bock code.

5. The method of claim 4, wherein the algebraic block code is a Reed-Solomon code.

6. The method of claim 1, wherein the first data element is encrypted.

7. The method of claim 1, wherein computing the erasure correcting code is performed in a centralized mode.

8. The method of claim 1, wherein computing the erasure correcting code is performed in a peer-to-peer mode.

9. A system, comprising:
   a processor configured to:
      create a redundancy data element by computing an erasure correcting code on elements of data from a first set of computers selected from among a plurality of computers connected by a digital network, wherein the plurality of computers includes a first computer and a second computer, wherein the first set of computers includes the first computer and the second computer, and wherein the elements of data from the first set of computers includes a first data element from the first computer and a second data element from the second computer;
      transmit the redundancy data element to a third computer for storage thereon;
      receive a request for data restoration relating to the first data element;
      create a restoration data, wherein the restoration data is a reconstruction of the first data element, wherein creating the restoration data includes computing an erasure correcting code on elements of data from a second set of computers, wherein the second set of computers includes the second computer and the third computer, and wherein the elements of data from the second set of computers includes the second data element and the redundancy data element; and
      provide the restoration data responsive to the request for data restoration; and
   a memory coupled to the hardware processor and configured to provide instructions to the processor.

10. The system of claim 9, wherein the elements of data from the first set of computers are stripes.

11. The system of claim 9, wherein the erasure correcting code is a parity code.

12. The system of claim 9, wherein the erasure correcting code is an algebraic bock code.

13. The system of claim 12, wherein the algebraic block code is a Reed-Solomon code.

14. The system of claim 9, wherein the first data element is encrypted.

15. A computer program product, embodied in a non-transitory computer readable medium and comprising computer instructions for:
   creating a redundancy data element by computing an erasure correcting code on elements of data from a first set of computers selected from among a plurality of computers connected by a digital network, wherein the plurality of computers includes a first computer and a second computer, wherein the first set of computers includes the first computer and the second computer, and wherein the elements of data from the first set of computers includes a first data element from the first computer and a second data element from the second computer;

transmitting the redundancy data element to a third computer for storage thereon;

receiving a request for data restoration relating to the first data element;

creating a restoration data, wherein the restoration data is a reconstruction of the first data element, wherein creating the restoration data includes computing an erasure correcting code on elements of data from a second set of computers, wherein the second set of computers includes the second computer and the third computer, and wherein the elements of data from the second set of computers includes the second data element and the redundancy data element; and providing the restoration data responsive to the request for data restoration.

16. The computer program product of claim 15, wherein the elements of data from the first set of computers are stripes.

17. The computer program product of claim 15, wherein the erasure correcting code is a parity code.

18. The computer program product of claim 15, wherein the erasure correcting code is an algebraic bock code.

19. The computer program product of claim 18, wherein the algebraic block code is a Reed-Solomon code.

20. The computer program product of claim 15, wherein the first data element is encrypted.

* * * * *